United States Patent [19]
Breed et al.

[11] Patent Number: 5,746,446
[45] Date of Patent: May 5, 1998

[54] PLASTIC FILM AIRBAG

[75] Inventors: David S. Breed, Boonton Township; William Thomas Sanders, Rockaway Township, both of N.J.

[73] Assignee: Automotive Technologies International, Inc., Denville, N.J.

[21] Appl. No.: 626,493

[22] Filed: Apr. 2, 1996

Related U.S. Application Data

[63] Continuation-in-part of Ser. No. 247,763, May 23, 1994, Pat. No. 5,505,485, Ser. No. 539,676, Oct. 5, 1995, Pat. No. 5,653,464, and Ser. No. 571,247, Dec. 12, 1995.

[51] Int. Cl.⁶ .................................................. B60R 21/02
[52] U.S. Cl. ................................... 280/743.1; 280/729
[58] Field of Search .................... 280/743.1, 729, 280/728.1, 743.2

[56] References Cited

U.S. PATENT DOCUMENTS

| | | | |
|---|---|---|---|
| 2,052,869 | 9/1936 | Coanda | 406/181 |
| 3,158,314 | 11/1964 | Young et al. | 417/191 |
| 3,204,862 | 9/1965 | Hadeler | 230/95 |
| 3,370,784 | 2/1968 | Day | 230/95 |
| 3,451,693 | 6/1969 | Carey | 280/739 |
| 3,473,824 | 10/1969 | Carey et al. | 280/150 |
| 3,511,519 | 5/1970 | Martin | 280/150 |
| 3,573,885 | 4/1971 | Brawn | 280/150 |
| 3,632,133 | 1/1972 | Hass | 280/150 |
| 3,638,755 | 2/1972 | Sack | 280/729 |
| 3,675,942 | 7/1972 | Huber | 280/738 |
| 3,702,706 | 11/1972 | Sobkow | 280/730 R |
| 3,752,501 | 8/1973 | Daniel et al. | 280/729 |
| 3,791,669 | 2/1974 | Hamilton | 280/150 |
| 3,801,127 | 4/1974 | Katter et al. | 280/150 |
| 3,820,814 | 6/1974 | Allgaier et al. | 280/150 AB |
| 3,888,504 | 6/1975 | Bonn et al. | 280/150 AB |
| 3,909,037 | 9/1975 | Stewart | 280/150 |
| 3,910,595 | 10/1975 | Katter et al. | 280/150 |
| 3,938,826 | 2/1976 | Giorgini et al. | 280/150 |
| 4,043,572 | 8/1977 | Hattori et al. | 280/736 |
| 4,262,931 | 4/1981 | Strasser et al. | 280/729 |
| 4,360,223 | 11/1982 | Kirchoff | 280/729 |
| 4,394,033 | 7/1983 | Goetz et al. | 280/736 |
| 4,657,516 | 4/1987 | Tassy | 280/729 |
| 4,805,930 | 2/1989 | Takada | 280/739 |
| 4,833,996 | 5/1989 | Hayashi et al. | 102/530 |
| 4,877,264 | 10/1989 | Cuevas | 280/731 |
| 4,909,549 | 3/1990 | Pool et al. | 280/738 |
| 4,928,991 | 5/1990 | Thorn | 280/738 |
| 4,963,412 | 10/1990 | Kokeguchi | 280/743 R |
| 4,964,652 | 10/1990 | Karlow | 280/739 |
| 5,004,586 | 4/1991 | Hayashi et al. | 422/164 |

(List continued on next page.)

FOREIGN PATENT DOCUMENTS

| | | | |
|---|---|---|---|
| 2122019 | 11/1971 | Germany | 280/729 |
| 0041437 | 2/1989 | Japan | 280/743 R |
| 0306849 | 12/1990 | Japan | 280/743 R |

OTHER PUBLICATIONS

"Warning:Too Much Safety May Be Hazardous", Barry Meier, New York Times, Sunday, Dec. 10, 1995, Section F, p. 8.

*Primary Examiner*—Christopher P. Ellis

[57] ABSTRACT

An inflatable occupant restraint device in an occupant protection system of a vehicle including a housing mounted in the vehicle and having an interior, at least one deployable airbag contained within the housing interior prior to deployment, an inflator coupled to the housing for inflating the airbag, the airbag being attached to and in fluid communication with the inflator, and an initiator for initiating a gas supply mechanism in the inflator to supply gas into the interior of the airbag in response to a crash of the vehicle. The airbag is made of a first non-perforated sheet of film and a member arranged in connection with the film sheet for arresting the propagation of a tear in the film sheet. The member is (i) a network of at least bi-directional material strips or (ii) a second non-perforated sheet of film having substantially anisotropic tear properties whereby the direction of least tear resistance of the second sheet of film is different than a direction of least tear resistance of the first sheet of film.

20 Claims, 18 Drawing Sheets

U.S. PATENT DOCUMENTS

| | | | |
|---|---|---|---|
| 5,060,973 | 10/1991 | Giovanetti | 280/736 |
| 5,085,465 | 2/1992 | Hieahim | 280/738 |
| 5,100,172 | 3/1992 | VanVoorhies et al. | 280/738 |
| 5,129,674 | 7/1992 | Levosinki | 280/738 |
| 5,188,558 | 2/1993 | Barton et al. | 446/224 |
| 5,193,847 | 3/1993 | Nakayama | 280/738 |
| 5,207,450 | 5/1993 | Pack, Jr. et al. | 280/738 |
| 5,248,275 | 9/1993 | McGrath et al. | 446/224 |
| 5,279,873 | 1/1994 | Oike | 428/35.4 |
| 5,286,054 | 2/1994 | Cuevas | 280/738 |
| 5,295,892 | 3/1994 | Felton | 446/224 |
| 5,332,259 | 7/1994 | Conlee et al. | 280/738 |
| 5,390,950 | 2/1995 | Barnes et al. | 280/728 B |
| 5,406,889 | 4/1995 | Letendre et al. | 102/201 |
| 5,423,571 | 6/1995 | Hawthorn | 280/738 |
| 5,501,259 | 3/1996 | Palm | 280/743.1 X |

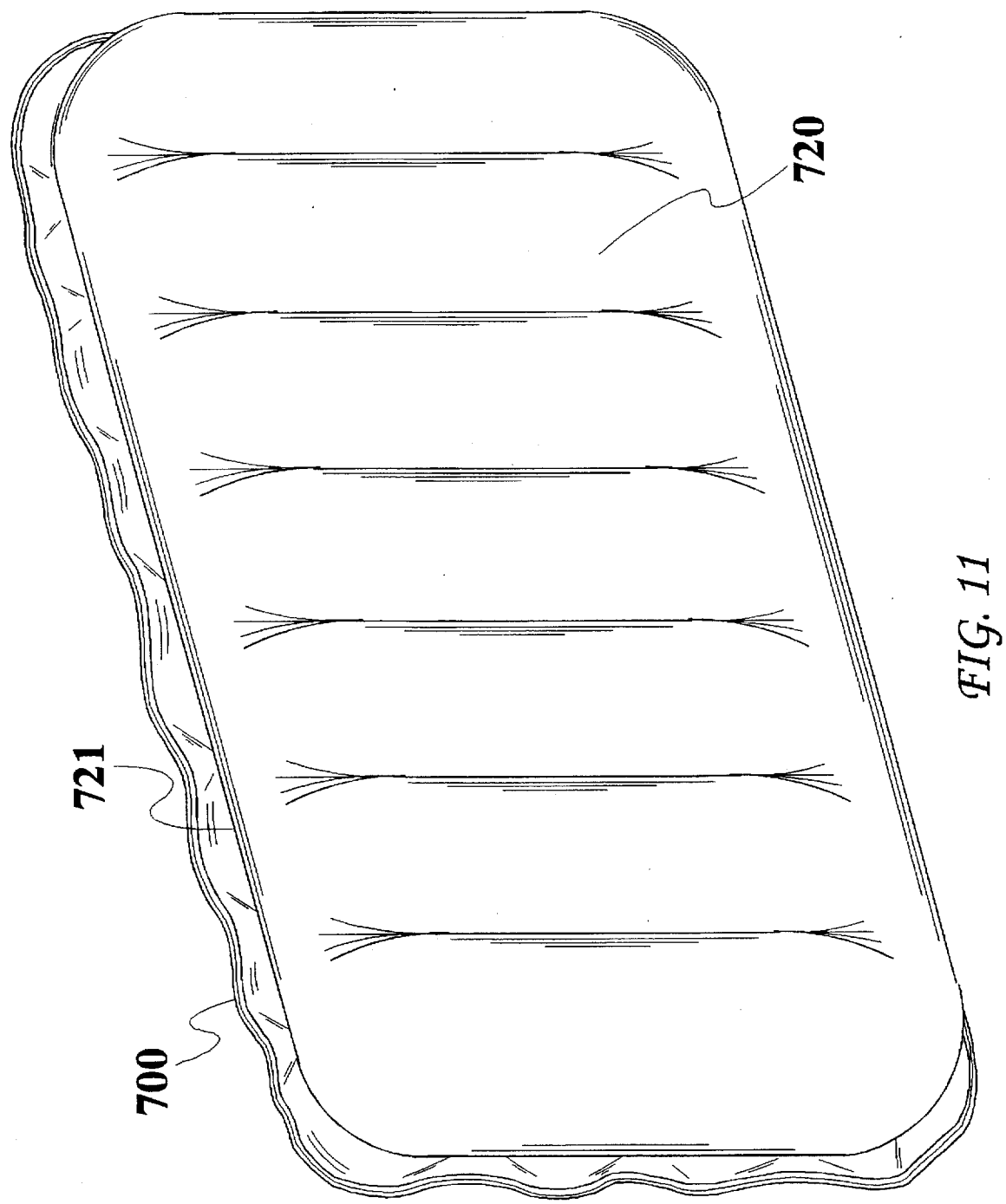

PLASTIC FILM AIRBAG

This application is a continuation-in-part (CIP) of U.S. patent application Ser. No. 08/247,763 filed May 23, 1994 (now U.S. Pat. No. 5,505,485), entitled "Plastic Film Airbag", of Ser. No. 08/539,676, entitled "Airbag System With Self Shaping Airbag", filed Oct. 5, 1995, (now U.S. Pat. No. 5,653,464) and of Ser. No. 08/571,247 entitled "An Efficient Airbag Module" filed Dec. 12, 1995, all of which are included herein by reference.

BACKGROUND OF THE INVENTION

1. Field of the Invention

The present invention relates to a vehicular airbag made substantially from thin plastic film which is designed to deploy in a collision involving the vehicle so that it impacts the occupant of the vehicle wherever he/she is located without causing significant injury to the occupant. In order to make a film airbag of sufficiently low mass so as to not injure the occupant, it must contain means to arrest the propagation of a tear so that a small hole or break in the film does not result in a catastrophic failure, i.e., causing the bag to burst like a balloon or prevent the airbag from deploying properly.

2. Description of the Prior Art

A conventional driver side airbag (also referred to herein as a driver airbag) is made from pieces of either Nylon or polyester fabric which are joined together, e.g., by sewing. The airbag is usually coated on the inside with neoprene or silicone for the purposes of (i) capturing hot particles emitted by the inflator in order to prevent holes from being burned in the fabric, and (ii) sealing the airbag to minimize the leakage of an inflating gas through the fabric. These airbags are conventionally made by first cutting two approximately circular sections of a material having a coating on only one side which will form a front panel and a back panel, and sewing them together with the coated side facing out. The back panel contains a hole for attachment to an inflator. Fabric straps, called tethers, are then sewn to the front panel. Afterwards, the airbag is turned inside out by pulling the fabric assembly through the inflator attachment hole placing the coated side on the inside. Assembly is completed by sewing the tethers to the back panel adjacent the inflator attachment hole.

If a conventional driver airbag is inflated without the use of tethers, the airbag will take an approximately spherical shape. Such an airbag would protrude significantly into the passenger compartment from the steering wheel and, in most cases, impact and injure the driver. To prevent this possible injury, the tethers are attached to the front and rear panels of the airbag to restrict the displacement of the front panel relative to the back panel. The result of the addition of such tethers is an airbag which has the shape of a flat ellipsoid with a ratio of the thickness of the airbag to its diameter of approximately 0.6. In the conventional airbag, the tethers are needed since the threads which make up the airbag fabric are capable of moving slightly relative to each other. The airbag is elastic for stresses which are not aligned with the warp or woof of the fabric. As a result, the fabric distorts to form an approximate sphere.

Moreover, the above-mentioned method of manufacturing an airbag involves a great deal of sewing and thus is highly labor intensive and, as a result, a large percentage of all driver airbags are presently manufactured in low labor cost countries such as Mexico.

Many people are now being injured and some killed by interaction with the deploying airbag (See, e.g., "Warning: Too Much Safety May Be Hazardous", New York Times, Sunday, Dec. 10, 1995, Section F, Page 8). One of the key advantages of the film airbag described in the above referenced patent applications is that, because of its much lower mass than conventional Nylon or polyester fabric airbags, the injury caused by this interaction is substantially reduced. In accordance with the teachings of those patent applications mentioned above, the driver airbag system can be designed to permit significant interaction with the driver. In other words, the film airbag can be safely designed to intrude substantially further into the passenger compartment without fear of injuring the driver. Nevertheless, in some cases, as disclosed in patent application Ser. No. 08/539,676, it may be desirable to combine the properties of a film airbag, which automatically attains the conventional driver airbag shape, with a fabric airbag. In such cases, interaction with the driver needs to be minimized.

Airbag systems today are designed so that ideally the airbag is fully inflated before the occupant moves into the space which is occupied by the airbag. However, most occupants are not positioned at the ideal location assumed by the airbag system designer. Many occupants sit very close to the airbags, or at least closer than expected by the airbag system designer, and as mentioned above, are injured by the airbag deployment. On the other hand, others sit far from the airbag, or at least farther away from the airbag than expected, and therefore must travel some distance, achieving a significant relative velocity, before receiving the benefit of the airbag.

Severe out of position occupant situations, where the occupant is resting against the airbag when deployment begins, can only be handled using an occupant position sensor, such as disclosed in the current assignee's copending patent application Ser. No. 08/040,978, which is included herein by reference, which prevents an airbag from deploying if an occupant is more likely to be seriously injured by the airbag deployment than from the accident itself. In many less severe accidents, the occupant will still interact with the deploying airbag and sustain injuries ranging from the mild to the severe. In addition, as mentioned above, some occupants sit very far from the steering wheel or instrument panel and, with conventional airbags, a significant distance remains between the occupant and the inflated airbag. Such occupants can attain a significant kinetic energy relative to the airbag before impacting it, which must be absorbed by the airbag. This effect serves to both increase the design strength requirements of the airbag and also increase the injury induced in the occupant by the airbag. For these reasons, it would be desirable to have an airbag system that adjusts to the location of the occupant and which is designed so that the impact of the airbag causes little or no injury to the occupant.

It is conventional in the art that airbags contain orifices or holes for exhausting the gas generated by the inflation means. Thus, typically within one second after the bag is inflated, the gas has been completely exhausted from the bag through the vent holes. This imposes several limitations on the restraint system which encompasses the airbag system. Take for example the case where an occupant is wearing a seatbelt and has a marginal accident, such as hitting a small tree, which is sufficient to deploy the airbag, but where it is not really needed since the driver is being restrained by his seatbelt. If the driver has lost control of the car and is traveling at 30 MPH, for example, and has a secondary impact one second or about 50 feet later, this time with a large tree, the airbag will have become deflated and thus is not available to protect the occupant in this secondary life threatening impact.

In other situations, the occupant might be involved in an accident which exceeds the design capability of the restraint system. These systems are typically designed to protect an average-size male occupant in a 30 MPH barrier impact. At higher velocities, the maximum chest deceleration experienced by the occupant can exceed 60 G's and become life threatening. This is particularly a problem in smaller vehicles, where airbag systems typically only marginally meet the 60 G maximum requirement, or with larger or more frail occupants.

There are many cases, particularly in marginal crashes, where existing crash sensors will cause the airbag to deploy late in the crash. This can also result in an "out-of-position occupant" for deployment of the airbag which can cause injuries and possibly death to the occupant. Other cases of out-of-position occupants are standing children or the forward motion of occupants during panic breaking prior to impact especially when they are not wearing seatbelts. The deploying airbag in these situations can cause injury to the out-of-position occupant.

The airbag must be available to protect an occupant for at least the first 100–200 milliseconds of the crash. Since the airbag contains large vents, the inflator must continue to supply gas to the airbag to replace the gas flowing out of these vents. As a result, inflators are usually designed to produce about twice as much gas than is needed to fill the airbag. This, of course, increases the cost of the airbag system as well as its size, weight and total amount of contaminants resulting from the gas which are exhausted into the automobile environment.

This problem is compounded when the airbag becomes larger so as to impact with the occupant wherever he/she is sitting as in the preferred implementation of the design of this invention. This then requires an even larger inflator which, in many cases, cannot be accommodated in conjunction with the steering wheel, if conventional inflator technology is utilized.

Furthermore, there is a great deal of concern today for the safety of a child in a rear facing child seat when it is used in the front passenger seat of a passenger airbag equipped vehicle. Currently used passenger side airbags have sufficient force to cause significant injury to a child sitting in such a seat and parents are warned not to use child seats in the front seat of a vehicle having a passenger side airbag. Additionally, several automobile companies are now experimenting with rear seat airbags in which case, the child seat problem would be compounded.

Airbags made of plastic film are disclosed in the copending patent applications referenced above. Many films have the property that they are quite inelastic under typical stresses associated with an airbag deployment. If an airbag is made from flat circular sections of such films and inflated, instead of forming a spherical shape, it automatically forms the flat ellipsoidal shape required for driver airbags as disclosed in copending U.S. patent application Ser. No. 08/539,676. This unexpected result vastly simplifies the manufacturing process for driver airbags since tethers are not required. Furthermore, since the airbag can be made by heat sealing two flat circular sections together without the need for tethers, the entire airbag can be made without sewing, reducing labor and production costs. In fact, the removal of the requirement for tethers permits the airbag to be made by a blow molding or similar process. Indeed, this greatly reduces the cost of manufacturing driver airbags. Thus, the use of film for making an airbag has many advantages which are not obvious.

In addition to the above referenced patent applications, film material for use in making airbags is described in U.S. Pat. No. 4,963,412 to Kokeguchi, which is included herein by reference. The film airbag material described in the Kokeguchi patent is considerably different in concept from that disclosed in the above referenced patent applications or the instant invention. The prime feature of the Kokeguchi patent is that the edge tear resistance, or notch tear resistance, of the airbag film material can be increased through the use of holes in the plastic films. Adding holes, however, reduces the tensile strength of the material by a factor of two or more due to the stress concentration effects of the hole. It also reduces the amount of available material to resist the stress. As such, it is noteworthy that the Kokeguchi steering wheel mounted airbag is only slightly thinner than the conventional driver side fabric airbag (320 micrometers vs. the conventional 400 micrometers) and is likely to be as heavy or perhaps heavier than the conventional airbag. Also, Kokeguchi does not disclose any particular shapes of film airbags or even the airbag itself for that matter and since his airbag has no significant weight advantage over conventional airbags, there is no teaching in Kokeguchi of perhaps the most important advantage of film airbags of the present invention, that is, in reducing injuries to occupants who interact with a deploying airbag.

As will be discussed in detail below, the airbags constructed in accordance with the present teachings attain particular shapes based on the use of the inelastic properties of particular film materials and reduce tear propagation through a variety of novel methods. It is also noteworthy that Kokeguchi discloses that vacuum methods can be used to form the airbag into the desired shape and thus fails to realize that the properties of inelastic film results in the airbag automatically forming the correct shape upon deployment. Also noteworthy is that Kokeguchi states that polymeric films do not have sufficient edge tear resistance and thus fails to realize that films can be so formulated to have this property. These limitations of the Kokeguchi patent results in a very thick airbag which although comprised of film layers no longer qualifies as a true film airbag as defined herein. A film airbag for the purposes herein is one wherein the film thickness is less than 250 micrometers and preferably below 100 micrometers for use as a driver protection airbag. As the size of the airbag increases, the thickness must also increase in order to maintain an acceptable stress within the film.

The neoprene or silicone coating on conventional driver airbags, as mentioned above, serves to trap hot particles which are emitted from some inflators, such as a conventional sodium azide inflator. A film airbag may be vulnerable to such particles, depending on its design, and as a result cleaner inflators that emit fewer particles are preferred over sodium azide inflators. Fortunately, new inflators using the pyrotechnic, hybrid and stored gas technologies, are being developed which do not produce hot particles and produce gases which are substantially cooler than gases produced by sodium azide inflators. Also, not all sodium azide inflators produce significant quantities of hot particles.

One interesting point which also is not appreciated by those skilled in the art heretofore, is that the gas temperature from the inflator is really not an issue in the choice of airbag materials except in the initial stages of the inflation. The total thermal energy of the gas in an airbag is, to a first order approximation, independent of the gas temperature which can be shown by application of the ideal gas laws. When the gas initially impinges on the airbag material in the early stages of the inflation process, the temperature is important and, if it is high, care must be taken to protect the material from the gas. Also, the temperature of the gas in the airbag is important if the vent holes are located where the outflowing gas can impinge on an occupant. The average temperature of the airbag itself, however, will not be affected significantly by the temperature of the gas in the airbag.

In the conventional airbag, the propellant which is used to inflate the airbag also is used to force open a hole in the vehicle trim, called the deployment door, permitting the airbag to deploy. Since the mass of a film airbag is substantially less than the conventional fabric airbag, much less energy is required to deploy the airbag in time. However, substantial pressure is still required to open the deployment door. Also, if the pressure now used to open the deployment door is used with film airbags, the airbag velocity once the door has been opened will be substantially higher than conventional airbags. This rapid deployment puts excessive stresses on the film airbag and increases the chance that the occupant will be injured thereby. For most implementations of the film airbag, an alternate less energetic method of opening the deployment door is thus necessary.

One such system is disclosed in Barnes et al. U.S. Pat. No. 5,390,950 titled "Method and arrangement for forming an air bag deployment opening in an auto interior trim piece". This patent describes a method of forming an air bag deployment opening in an interior trim piece having a vinyl skin overlying a rigid substrate so as to be invisible prior to operation of the air bag system comprising an energy generating linear cutting element arranged in a door pattern beneath the skin acting to degrade or cut the skin when activated.

The goal of the Barnes et al. patent is to create an invisible seam when the deployment door is located in a visible interior trim panel. This permits greater freedom for the vehicle interior designer to create the particular aesthetic effect that he or she desires. The invisible seam of the Barnes et al. patent is thus created for aesthetic purposes with no thought toward any advantages it might have to reduce occupant injury or advantages for use with a film airbag, or to reduce injuries at all for that matter. One unexpected result of applying the teachings of this patent is that the pressure required to open the deployment door is substantially reduced. When used in conjunction with a film airbag, this result is important since the inflator can be designed to provide only sufficient energy to deploy and inflate the very light film airbag thereby significantly reducing the size of the inflator. The additional energy required to open a conventional deployment door above that required to open a door constructed in accordance with the teachings of the Barnes et al. patent is not required within the inflator. Furthermore, since a film is more vulnerable to being injured by ragged edges on the deployment door than a conventional fabric airbag, the device of the Barnes et al. patent can be used to pyrotechnically cut open the deployment door permitting it to be easily displaced from the path of the deploying airbag, minimizing the force of the airbag against the door and thus minimizing the damage to the film airbag from the deployment door. Since Barnes et al. did not contemplate a film airbag, advantages of its use with the pyrotechnically opening deployment door could not have been foreseen.

The discussion of the self-shaping airbag thus far has been limited to film airbags. An alternate approach is to make an airbag from a combination of fabric and film. The fabric provides the tear resistance and conventional airbag appearance. The film forces the airbag to acquire the flat ellipsoidal shape desired for driver airbags without the use of tethers and permits the airbag to be assembled without sewing using heat and/or adhesive sealing techniques. Such a hybrid airbag is made from fabric and film which have been laminated together prior to the cutting operation. Naturally, the combination of a film and net, as described in the above referenced patent applications, is equally applicable for the airbag described here and both will be referred to herein as hybrid airbags and belong to the class of composite airbags.

A finite element analysis of conventional driver side airbags shows that the distribution of stresses is highly unequal. Substantial improvements in conventional airbag designs can be made by redesigning the fabric panels so that the stresses are more equalized. Today, conventional airbags are designed based on the strength required to support the maximum stress regardless of where that stress occurs. The entire airbag must then be made of the same thickness material as that chosen to withstand maximum stress condition. Naturally, this is wasteful of material and attempts have been made to redesign the airbag to more closely equalize the stress distribution and permit a reduction in fabric strength and thus thickness and weight. However, this optimization process when used with conventional fabric airbags can lead to more complicated assembly and sewing operations and more expensive woven materials. An example of such an airbag is that marketed by Precision Fabrics of Greensboro, N.C. Thus, there is a tradeoff between manufacturing cost and airbag optimization.

With the film airbag manufactured using blow molding techniques, for example, much greater freedom is permitted to optimize the airbag vis-a-vis equalization of the stress. First, other than tooling cost, the manufacturing cost of an optimized airbag is no greater than for a non-optimized airbag. Furthermore, the thickness of the film can be varied from one part of the airbag to another to permit the airbag to be thicker where the stresses are greater and thinner where the stresses are less. A further advantage of blow molding is that the film can be made of a single constituent material. When the airbag is fabricated from sheet material, the outside layer of the material needs to be heat sealable, such as is the case with polyethylene, or else a special adhesive layer is required where the sealing occurs.

One example of an inflatable film product which illustrates the self shaping technology of this invention is the common balloon made from metalized "Mylar™" plastic film found in many stores. Frequently these balloons are filled with helium. They are made by heat sealing two flat pieces of film together as described in U.S. Pat. Nos. 5,188,558 (Barton), 5,248,275 (McGrath), 5,279,873 (Oike), and 5,295,892 (Felton). Surprisingly, the shape of these balloons, which is circular in one plane and elliptical in the other two planes, is very nearly the shape which is desired for a driver side airbag. This shape is created when the pressure within the balloon is sufficiently low such that the stresses induced into the film are much smaller than the stresses needed to significantly stretch the film. The film used is relatively rigid and has difficulty adjusting to form a spherical shape. In contrast, the same airbag made from woven material more easily assumes an approximate spherical shape requiring the use of tethers to create the shape which comes naturally with the Mylar™ balloons.

One problem with film balloons is that when a hole is punctured in the balloon it fails catastrophically. One solution to this problem is to use the combination of a film and net as described in the above referenced patent applications. Such materials have been perfected for use as sail material for lightweight high performance sails for sailboats. One example is marketed under the trade name Bainbridge Sailcloth SL Seriesr™, and in particular SL 500-P™, 1.5 mill. This material is a laminate of a film and a net. Such materials are frequently designed to permit heat sealing thereby eliminating threads and the stress concentrations associated therewith. Heat sealing also simplifies the manufacturing process for making sails. Another preferable solution is to make the airbags from a film material which naturally resists tears, that is, one which is chemically formulated to arrest a tear which begins from a hole, for example.

Applications for the self shaping airbag described herein include all airbags within the vehicle which would otherwise required tethers or complicated manufacturing from several separate panels. Most of these applications are more difficult to solve or unsolvable using conventional sewing technology. The invention described herein solves the above problems by using the inelastic properties of film, otherwise stated as the high modulus of elasticity, plus innovative designs based on analysis including mathematical modeling plus experimentation. In this manner, the problems discussed above, as well as many others, are alleviated or solved by the self shaping airbags described in the paragraphs below.

Other relevant prior art includes the following, with a brief explanation of the pertinence of the reference to the present invention:

U.S. Pat. No. 3,511,519 (Martin) discloses a large fabric airbag which is shown impacting the occupant. It uses fixed orifices and does not discuss the problem of injury to the occupants due to the impact of the airbag.

U.S. Pat. No. 3,573,885 (Brawn) shows a blowout patch assembly but not variable exhaust orifices.

U.S. Pat. No. 3,820,814 (Allgaier) discloses variable exhaust vents located within the fabric airbag material.

U.S. Pat. No. 3,888,504 (Bonn) illustrates an inflatable occupant restraint airbag which is comprised at least in part of a woven stretch fabric which is permeable to fluid used to inflate the bag, the bag having a variable porosity which increases and decreases in relation to the fluid pressure within the bag.

U.S. Pat. No. 4,262,931 (Strasser) illustrates two airbags joined together to cover right and center seating positions.

U.S. Pat. No. 4,360,223 (Kirchoff) discloses a low-mount, air bag module for the passenger side of an automobile that uses two bags that are folded within a housing that is open at one end. One of the bags is for restraining the knees of the passenger to prevent forward sliding in the event of a crash, the other bag being for restraining the torso. The knee bag is inside the torso bag and they are both attached directly to the inflator, the knee bag being arranged to be inflated first. The torso bag then is inflated to prevent forward rotation of the passenger from the hips.

Further, in accordance with the Kirchoff invention, a pressure responsive orifice means is provided in a second opening in the wall of the knee bag. This orifice means controls the flow of gas through the opening in the wall of the knee bag thereby to insure a predetermined gas pressure within the knee bag, while permitting subsequent inflation of the torso bag by gases passing into the torso bag through the orifice means. Thus, a knee bolster airbag is disclosed but it is positioned inside of the main torso airbag and inflated by the same inflator.

U.S. Pat. No. 4,394,033 (Goetz) discloses a temperature compensation system. The claimed inflatable occupant-restraint system in a vehicle includes a generator for producing fluid under pressure placed that a portion of the generator is outside the cushion and has a resilient venting means for dumping increasing fractions of gas volume outside the cushion at increasing operating temperatures.

U.S. Pat. No. 4,805,930 (Takada) discloses a temperature compensation system. Further, it describes stitched thread seams between fabric elements of the envelope of a vehicle safety air bag which induce localized distension and opening up of the envelope fabrics along the seams, thereby causing the film coatings of the envelope fabric to rupture along the seam and allow gas to escape and maintain a substantially constant overall maximum pressure, regardless of variations in ambient temperature.

U.S. Pat. No. 3,451,693 (Carey) does not disclose plastic film, merely plastic. The distinguishable properties of film are numerically described in the instant specification and basically are thinner and less weight. Carey does disclose variable exhaust orifice means at col. 3, 11. 63+ to maintain constant pressure in the airbag as the occupant is thrown into the airbag. However, the material is not plastic film with means to arrest the propagation of a tear. In fact, it is unclear in Carey as to whether the orifice means therein is repeatable/reusable and no mention is made as to whether the stretching of the orifice means area is permanent or temporary.

U.S. Pat. No. 3,638,755 (Sack) discloses a two-bag airbag combination, with one bag contained within the other.

U.S. Pat. No. 3,675,942 (Huber) discloses a unidirectional valve which permits air to enter the bag, but prevents its escape in the event the pressure within the bag exceeds that of the atmosphere within the vehicle, such as by the impact of a person with the bag.

U.S. Pat. No. 3,752,501 (Daniel) discloses an inflatable cushion device for protective interposition between a vehicle operator and the rim and hub of a vehicle steering wheel assembly. The cushion is compartmented to provide, when inflated, peripheral ring compartmentation in juxtaposition to the steering wheel rim and center compartmentation in overlying juxtaposition to the steering wheel hub. The peripheral ring compartmentation when pressurized provides greater resistance to collapse than the center compartmentation, whereby the peripheral ring compartmentation is adapted to guide the vehicle operator upon contact of the latter with the cushion toward the center compartmentation thereby to maintain the vehicle operator in substantially centered cushioned relationship to the steering wheel assembly under vehicle impact conditions. This air bag contains two compartments; an outer, donut-shaped ring or torus and an inner compartment of somewhat larger volume. This is an example of a bag within a bag where an outer bag is connected to an inner bag by flapper valves.

U.S. Pat. No. 4,964,652 (Karlow) discloses a system for venting excessively high pressure gas incident to deployment of an airbag comprising a diaphragm that is rupturable upon the occurrence of a threshold pressure internally of the airbag to instantaneously release the pressure. This is a pressure relief system through the center of the module.

Japanese Patent No. 89-090412/12 discloses fabricated cloths are laminated in layers at different angles to each other's warp axis to be integrated with each other. Strength and isotropy are improved. The cloth is stated as being useful for automotive air bags for protecting the passenger's body.

OBJECTS AND SUMMARY OF THE INVENTION

A principal object of this invention is to form an airbag from flat sheets of film or composite material, or by blow molding or a similar process in order to create an airbag for use to protect occupants in the event of a crash of the vehicle, which is substantially larger than current airbags and which is designed to interact with the occupant regardless of where he/she is positioned without causing significant injury and thereby to improve the protection provided by the airbag. The driver airbag version uses the inelastic properties of the film material to cause the airbag to attain the desired shape without requiring the use of tethers. As a driver side airbag, for example, it can be substantially elliptical in two orthogonal planes and circular in a third orthogonal plane. If a composite material composed of film and a net, or film and a fabric, is used to form a hybrid design, the relatively inelastic properties of the film are used to create the desired flat elliptical shape, for example, while the net or fabric is used to provide other desirable features including tear resistance. Finally, the vent which controls the flow of gas out of the airbag is made responsive to the pressure of the gas within the airbag, remaining substantially closed for pressures below a design value and opening sufficiently when the pressure rises above that value.

Other objects and advantages of this invention include:

1. To provide an airbag which can be made without the use of sewing.

2. To provide an airbag which is considerably lighter and smaller when folded in the I inoperative condition than fabric airbags.

3. To provide a driver airbag which does not require the use of tethers.

4. To provide an airbag for use on the front passenger side of the vehicle which can be easily manufactured from a minimum number of parts without the use of sewing.

5. To provide a substantially conventional driver fabric airbag which can be manufactured without the use of tethers.

6. To provide an airbag which can be manufactured using a low cost blow molding or similar technology.

7. To provide an airbag which has been optimized to substantially equalize the stresses in the material.

8. To provide an airbag where the material thickness is varied to reduce the stress in the high stress areas of the airbag.

9. To provide an airbag where optimization procedures have been used to substantially eliminate folds and wrinkles in the surface of the inflated airbag.

10. To provide an airbag comprising film where the thickness to diameter ratio is less than 0.7 without the use of tethers and, in some cases, less than 0.6.

11. To provide a very low cost airbag.

12. To provide a method of manufacturing an airbag permitting any desired shape airbag to the manufactured from two panels.

13. To provide an airbag module utilizing the combination of an airbag made substantially of film and a pyrotechnically opening deployment door.

14. To provide an airbag module which is substantially less injurious to out-of-position occupants during airbag deployment.

15. To utilize thin film airbags in a manner which eliminates the catastrophic bursting of the film in the event of an inadvertent puncture.

16. To provide an occupant restraint airbag system for a single occupant which is composed of a plurality of airbags.

17. To provide an airbag system for the protection of an occupant which automatically adjusts to the occupant's seating position.

18. To provide an airbag system which automatically adjusts to the presence of a child seat.

19. To provide an airbag system which exhausts back through the inflator structure thereby eliminating the need for vent holes in the airbag.

20. To provide a method of containing a plurality of airbags through the use of a net structure.

21. To provide an airbag system having a variable exit orifice to reduce occupant injury including chest and head maximum accelerations, to reduce the amount of propellant required, and to permit more efficient use of the airbag deflation.

22. To provide a simple construction method for an airbag composed of several airbags.

23. To provide an airbag design which will be available in the event of multiple impacts where the airbag is not fully utilized during the initial impact.

24. To retain the gas in the airbag for a substantial period of time until it is impacted by an occupant.

25. To minimize the total amount of gas and contaminants produced by all of the inflators in the vehicle.

26. To reduce the injury potential to an out-of-position occupant from the deploying airbag.

It is also an underlying object of the invention to provide a new airbag module in which the disadvantages of prior art systems are overcome. Thus, one embodiment of the airbag module in accordance with the invention includes several features, namely: (i) an airbag made from plastic film, (ii) using a larger airbag which is designed to interact with the occupant without causing significant injury, (iii) a deployment door which is opened pyrotechnically and (iv) the use of a variable vent which adjusts the outflow from the airbag to maintain a nearly constant pressure within the airbag. Such an airbag system construction solves the problems with the prior art and offers substantially greater protection to the vehicle occupant in the event of a crash of the vehicle. In none of the prior art references mentioned above, is it suggested that an airbag should be designed to interact with the occupant regardless of his/her location within the front passenger compartment of the vehicle and that the injury which occurs during the deployment phase of the airbag can be substantially reduced through this combination of features.

Other objects and advantages of the present invention will become apparent from the following description of the preferred embodiments taken in conjunction with the accompanying drawings.

Briefly though, in a most basic embodiment, the inflatable occupant restraint device in an occupant protection system of a vehicle in accordance with the invention comprises a housing mounted in the vehicle and having an interior, at least one deployable airbag contained within the housing interior prior to deployment, inflation means coupled to the housing for inflating the airbag, said inflation means comprising gas generation means for generating a gas adapted to flow into an interior of the airbag, attachment means for attaching the airbag to and in fluid communication with the inflation means and initiation means for initiating the gas generation means to generate the gas in response to a crash of the vehicle. The airbag comprises a first non-perforated sheet of film and a member arranged in connection with the first film sheet for arresting the propagation of a tear therein. The member is selected from the group consisting of (i.) a net or network of at least bi-directional (i.e. multi-directonal) material strips and (ii.) a second non-perforated sheet of film having substantially anisotropic tear properties whereby the direction of least tear resistance of the second sheet of film is different than a direction of least tear resistance of the first sheet of film.

The net surrounds the airbag during and after deployment thereof and is attached to the housing. The net may be contained within the housing interior prior to deployment and comprises an interlaced network of at least bi-directionally arranged material strips, i.e., an interlaced or intercrossed network.

In other embodiments, the first side of the net is positioned adjacent the airbag prior to deployment thereof and a film layer is arranged on a second side of the net whereby the airbag is the innermost member in a direction of deployment. At least one additional deployable airbag separate from and exclusive of the first airbag may be situated inside the net. The interlaced network of material strips may comprise a mesh of densely packed random fibers arranged in a multitude of directions or a mesh of densely packed crystalline polyamide fibers arranged in a multitude of directions.

The present invention also includes an inflatable occupant restraint assembly for protecting an occupant in the event of a crash comprising at least one airbag module mounted in the vehicle and including at least two airbags substantially coextensive with each other and adjoining one another and inflation means arranged in connection the airbags for inflating an inner one of the airbags such that upon inflation of the inner airbag, the outer airbag is also inflated. The assembly also includes initiation means for initiating the inflation means in response to a crash of the vehicle. One or both of the airbags has a tubular shape, whereby for multiple airbags the principle axis of each airbag is substantially parallel to the principle axis of the other airbags. A net may be provided to surround the airbags.

In further embodiments, the airbag has a mass to enable it to be deployed to a sufficient size upon complete inflation by the inflation means into direct engagement with a 50% male dummy sitting in the mid seating position of the vehicle such that there is no substantial distance between the dummy and the fully inflated airbag prior to impact of the dummy and the airbag caused solely by the movement of the dummy. This can be achieved by appropriate selection of the dimensions of the airbag and/or the net, i.e., the net can be constructed with a specific size to extend to this point in space in a certain amount of time. Also, the airbag can be provided with a ventilation port such that when outward deployment of the airbag is impeded, e.g., by a rear facing child seat, pressure in the airbag is relieved by means of the ventilation port.

The present invention also includes an embodiment of an inflatable occupant protection module comprising a housing having an interior, an airbag contained within the housing interior prior to deployment, the airbag being attached to the housing and being constructed substantially of plastic film, inflation means coupled to the airbag for inflating the airbag. The airbag has a mass to enable the airbag to be deployed to a sufficient size upon complete inflation by the inflation means into direct engagement with a 50% male dummy sitting in the mid seating position of the vehicle such that there is no substantial distance between the dummy and the fully inflated airbag prior to impact of the dummy with the airbag caused by the movement of the dummy. The inflation means comprise gas generation means in flow communication with an interior of the airbag. The module also includes pressure control means for controlling outflow of gas generated by the gas generation means from the inflated airbag as a function of the pressure within the airbag, attachment means for attaching the inflation means to the housing, initiation means for initiating the gas generation means in response to a crash of the vehicle, and mounting means for mounting the module to the vehicle.

In other embodiments, the airbag comprises at least two pieces of substantially flat inelastic plastic film having peripheral edges, a first one of the pieces of inelastic plastic film having at least one port; first attachment means for attaching the pieces of inelastic plastic film together only at the peripheral edges to form a substantially sealed airbag; inflating means for inflating the airbag by directing gas into an interior of the airbag through the at least one port; coupling means for coupling the airbag to the inflating means; initiation means for initiating the inflation means in response to a crash of said vehicle to thereby cause deployment of the airbag; and second attachment means for attaching the inflating means to the vehicle. In this manner, upon inflation of the airbag by the inflating means, the pieces of inelastic plastic film deform substantially without stretching. Also, the attaching of the pieces of plastic film together only at the peripheral edges precludes the use of tethers which are conventionally used to connect inner regions of the pieces of airbags together to provide the desired ellipsoid shape. Finally, in most implementations, the airbag is significantly larger than a conventional airbag and is designed to permit interaction of the occupant with the airbag as it is deploying with minimal injury to the occupant.

With respect to specific parts of the vehicle to which the airbag may be attached, suitable parts include the steering wheel of the vehicle, the headliner of the vehicle and an instrument panel of the vehicle. The airbag when deployed from the headliner preferably extends substantially across a major portion of the front seat of the vehicle if not the entire front seat.

The airbag also includes means for preventing the propagation of a tear, such as a laminated fabric or net, which are connected to each of the pieces of inelastic plastic film, or within the formulation of the plastic film material itself Also, the two pieces of film may be formed as one integral piece by a blow molding or similar thermal forming process.

In another embodiment, the piece of inelastic plastic film having the port also includes at least one variable outlet vent comprising pressure responsive means for controlling opening thereof and thus flow of gas therethrough in response to pressure within the airbag. In this manner, upon inflation of the airbag, the variable vent is substantially closed until the airbag is impacted by the occupant at which time the variable vent opens by an amount determined by the pressure in the airbag thereby controlling the deceleration of the occupant.

BRIEF DESCRIPTION OF THE DRAWINGS

The following drawings are illustrative of embodiments of the invention and are not meant to limit the scope of the invention as encompassed by the claims.

FIG. 11 is a perspective view of an airbag system for rear seat passengers where the airbag is formed from tubes.

DETAILED DESCRIPTION OF THE PREFERRED EMBODIMENTS

A fundamental problem with the use of plastic films for airbags is that when a single conventional film is used and a tear is introduced into the film, the tear propagates easily and the airbag fails catastrophically upon deployment. As noted above, this invention is concerned with various methods of eliminating this problem and thus of permitting the use of films for airbags with the resulting substantial cost and space savings as well as a significant reduction in injuries to occupants. The reduction in occupant injury arises from the fact that the film is much lighter than the fabric in a conventional airbag and it is the mass of the airbag traveling at a high velocity which typically injures the out-of-position occupant.

One method of solving the tear problem is to use two airbags or two airbag layers, one inside the other, where the airbags or layers are attached to each other with an adhesive which is strong enough to hold the two airbags or layers closely together but not sufficiently strong to permit a tear in one airbag or layer to propagate to the other. If a tear is initiated in the outer airbag or layer, for example, and the material cannot support significant tensile stresses in the material close to the tear, the inner airbag or layer must accommodate the increased tensile stress until it can be transferred to the outer bag at some distance from the tear. If the tear is caused by a small hole, this increased stress in the inner bag may only occur for a few hole diameters away from the hole.

A problem arises with this system when the cause of the tear in one airbag also causes a tear in the second airbag. This problem can be solved if the materials used for the two airbags are strongly anisotropic and are attached to each other with their preferred tear directions placed at an angle, i.e., a right angle, to each other. In other words, the direction of least tear resistance of the first airbag is substantially different than the direction of least tear resistance of the second airbag. In this case, even though a tear starts in both airbags at the same time and place, the tear will propagate along mutually perpendicular directions and a catastrophic failure will be avoided upon airbag deployment. An example of a two layer airbag construction is illustrated in FIG. 1 which is a perspective view with portions cut away and removed of a film airbag made from two layers or sheets of film material.

Figure 1:
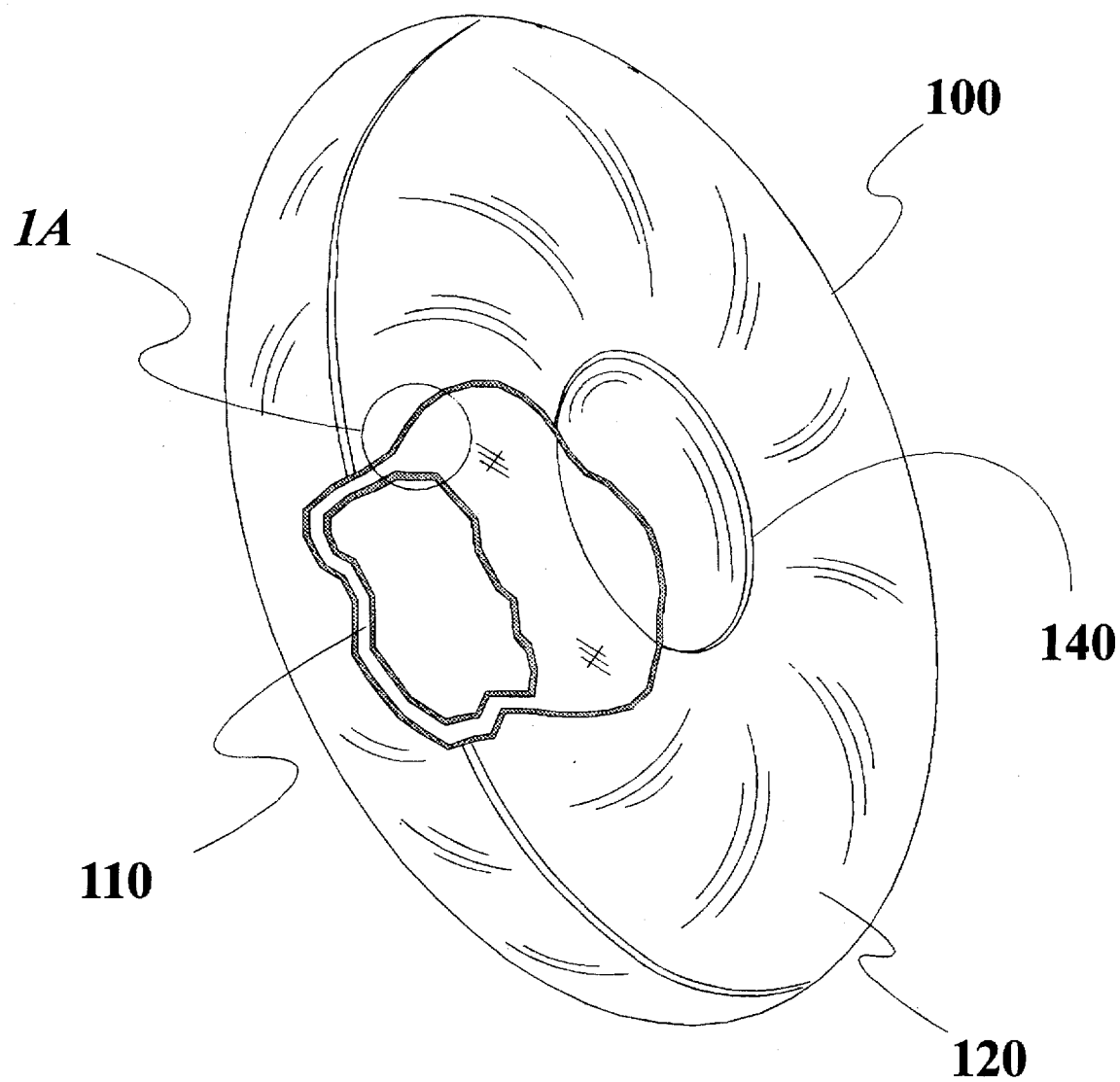
FIG. 1 is a perspective view with portions cut away and removed of a film airbag wherein the film is comprised of at least two layers of material which have been joined together by a process such as co-extrusion.
Figure 1A:
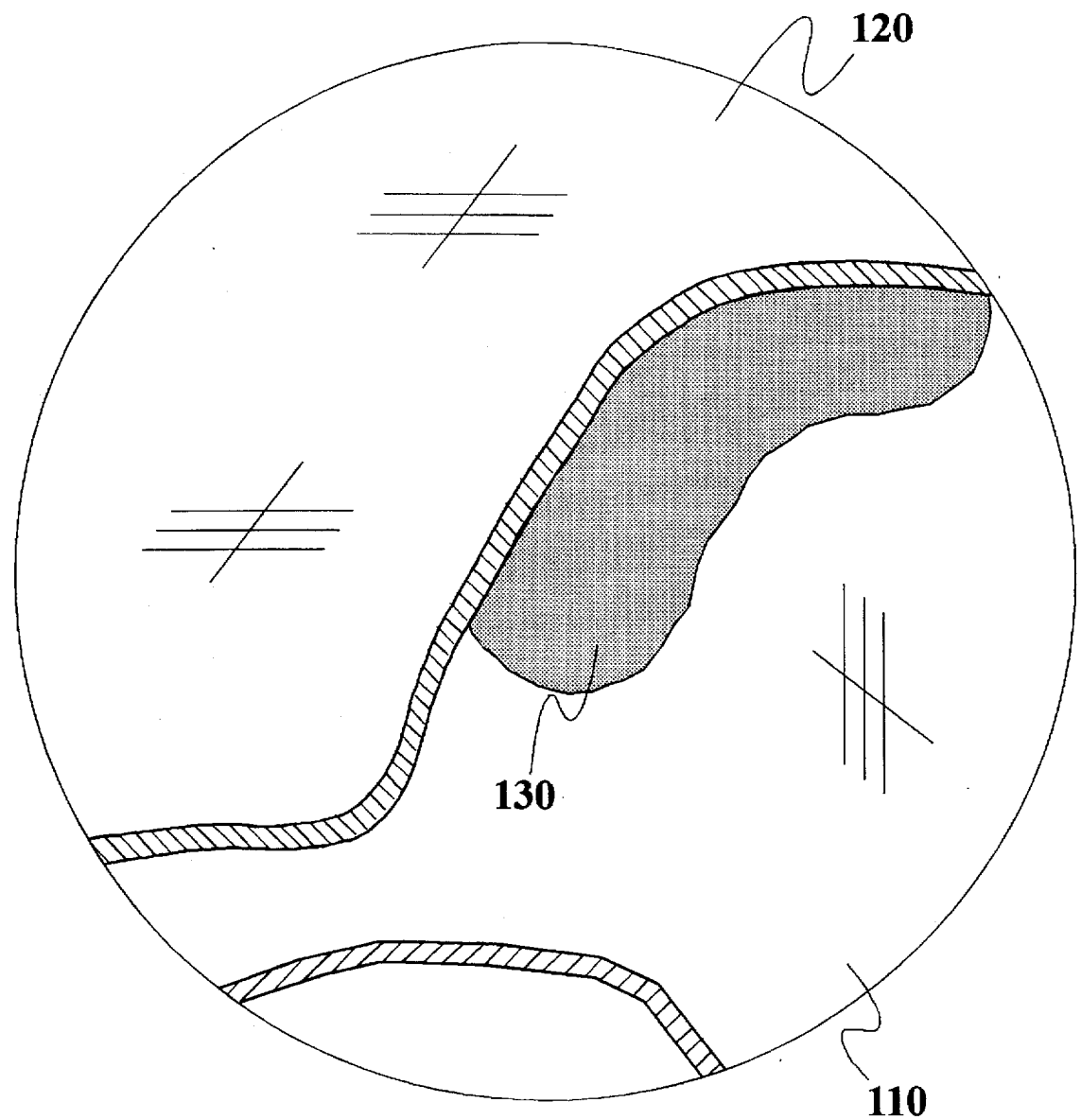
FIG. 1A is an enlarged view of the inner film airbag layer and outer film airbag layer taken within circle 1A of FIG. 1.

In FIG. 1, the airbag is shown in the inflated condition generally at 100 with one film layer 110 lying inside a second film layer 120. The film layers 110, 120 or sheets of film are non-perforated and are also referred to as airbags herein since they constitute the same. FIG. 1A is an enlarged view of the material of the inner layer 110 and outer layer 120 taken within circle 1A of FIG. 1. When manufactured, the film of the inner layer is made so that the preferred tear propagation direction is in the vertical direction, for example, as shown in FIG 1A. In this case, the preferred tear direction for the film of the outer layer 120 is in the horizontal direction (that is, at a right angle to the vertical direction). The two film layers are held together by adhesive means such as an adhesive 130. In FIG. 1 a driver side airbag is illustrated where the bag is formed from two flat pieces of material and a center cylindrical piece 140 all of which are joined together using heat sealing with appropriate reinforcement at the heat sealed joints. Heat sealing entails the application of heat to one or both of the surfaces to be joined. In most implementations, the center cylindrical piece 140 is not required as taught in co-pending patent application Ser. No. 08/539,676 cross-referenced above.

The example of FIG. 1 is meant to be illustrative of a general technique to minimize the propagation of tears in a composite film airbag. In an actual airbag construction, the process can be repeated several times to create a composite airbag composed of several layers each joined together with adhesives which are weaker than the films. For the purposes of this disclosure, the term composite airbag will mean a film airbag composed of two or more layers which may or may not be joined together including cases where the layers are joined during an extrusion processing step such as in co-extrusion, or where a film layer is combined with another reinforcing material such as fibers or a woven or molded net.

The materials used for the various film layers can be the same or different and are generally made from nylon, polyethylene or polyester, although other materials could also be used. The use of different materials for the different layers has the advantage that tear propagation and strength properties can complement each other. For example, a material which is very strong but tears easily can be alternated with a weaker material which requires a greater elongation before the tear propagates.

In the implementation of FIG. 1, the adhesive 130 has been applied in a uniform coating between the film layers. In some cases, it is preferable to place the adhesive in a pattern so as to permit a tear to propagate a small distance before the stress is transferred between layers. This permits the stress concentration points to move a small distance away from each other in the two films and further reduces the chance that a catastrophic failure will result. Thus, by selecting the pattern of the application of the adhesive and/or the location(s) of application of the adhesive, it is possible to control the propagation of a tear in the film airbag.

Figure 1B:
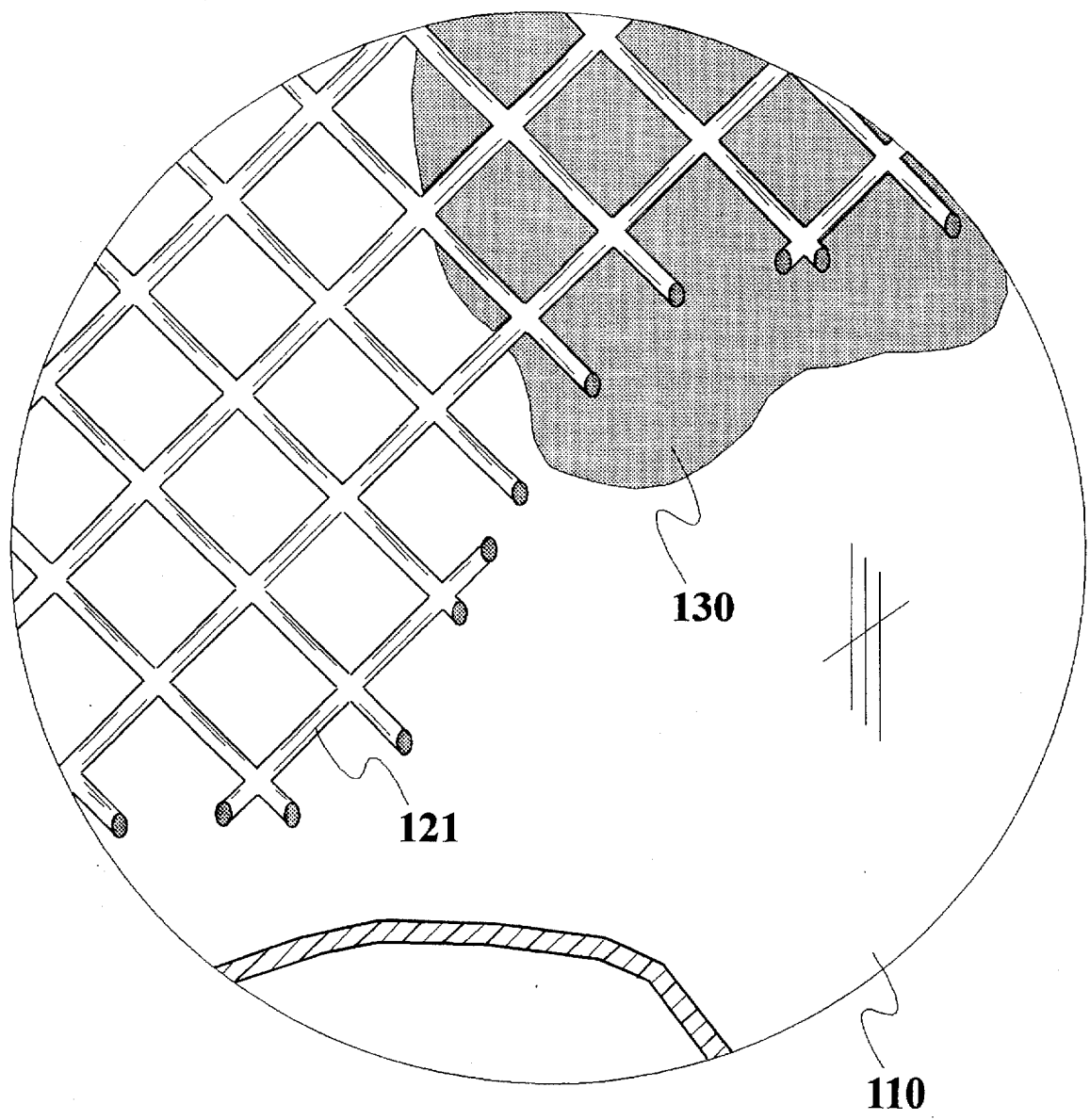
FIG. 1B is an enlarged view of the material of the inner film airbag and outer film airbag taken within circle 1A of FIG. 1 but showing an alternate configuration where the outer airbag layer has been replaced by a net.

FIG. 1B illustrates an alternate configuration where the outer airbag has been replaced by a net 121. A "net" is defined for the purposes of this application as an interlaced or intercrossed network of a substance or material, e.g., strips of material which cross one another. The interlacing may be generated, e.g., by weaving discrete elongate strips of material together or by molding in which case the material is molded into the network to provide an intercrossed structure upon formation. The strips of material may be joined at the intersection points in the event that discrete material strips are woven together. In the illustrated embodiment, the material strips which constitute the net are oriented in two perpendicular directions. However, it is within the scope of the invention to have a net comprising material strips oriented in two, non-perpendicular direction (at an angle to one another though) or three or more directions so long as the material strips are interlaced with each other to form the net. Also, it is understood that the net has openings surrounded by material having a thickness and width substantially smaller than the openings.

The net 121 can be attached by an adhesive 130, or by another method such as heat sealing, to the inner airbag 110 or it can be left unattached to the inner airbag 110 but nevertheless attached to the housing of the airbag system. In this case, the stress in the inner airbag 110 is transferred to the net 121 which is designed to carry the main stress of the composite airbag and the film is used mainly to seal and prevent the gas from escaping. Since there is very little stress in the inner film layer 110, a tear will in general not propagate at all unless there is a failure in the net structure. The net 121 in this illustration has a mesh structure with approximately square openings of about 0.25 inches. The adhesive also serves the useful purpose of minimizing the chance that the net 121 will snag buttons or other objects which may be worn by an occupant.

In one embodiment, the net 121 is attached to the housing of the airbag 110 and is designed to enclose a smaller volume than the volume of the airbag 110. In this manner, the airbag will be restrained by the net 121 against expansion beyond the volumetric capacity of the net 121.

Figure 1C:
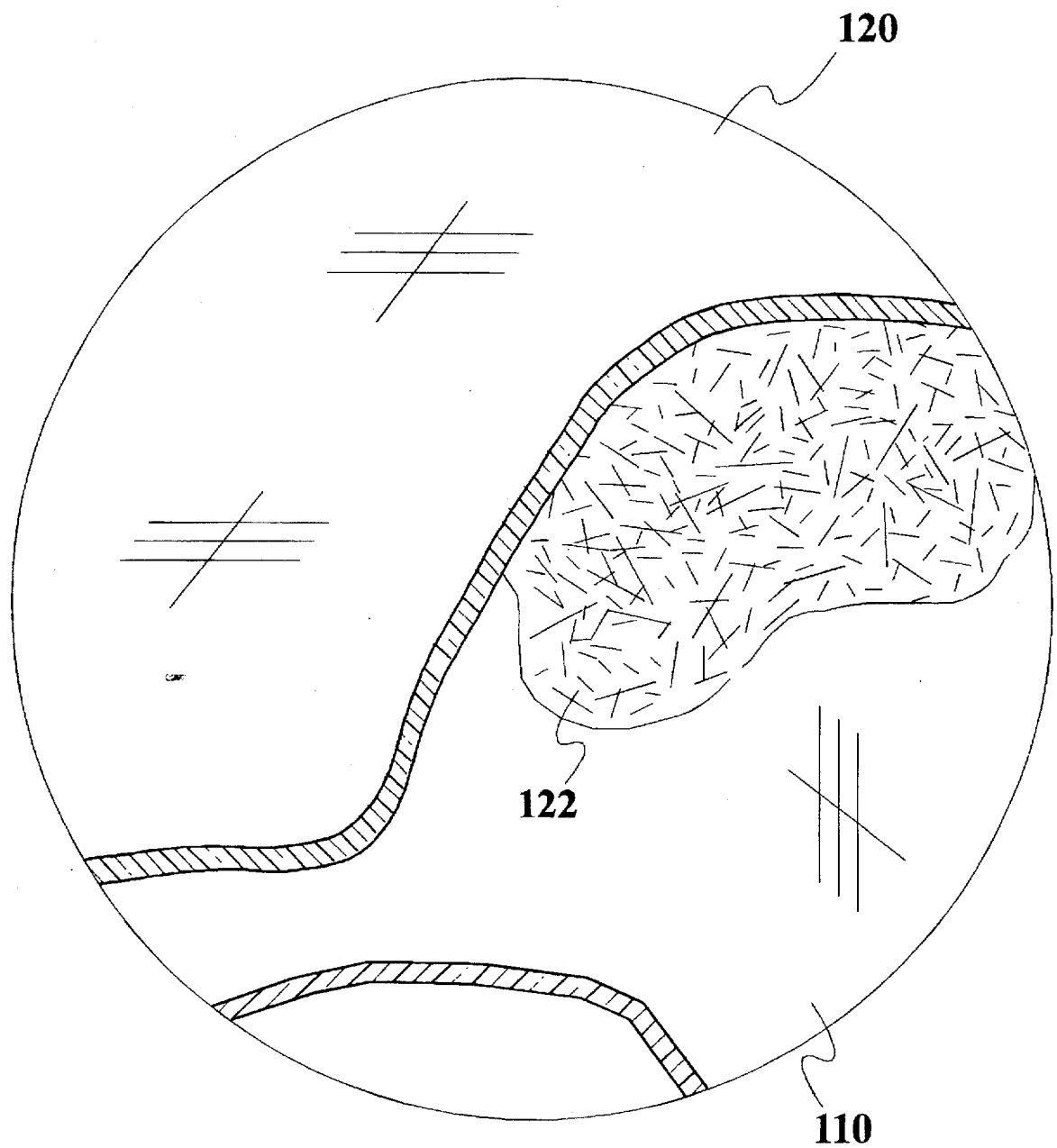
FIG. 1C is an enlarged view of the material of the inner film airbag layer and outer film airbag layer taken within circle 1A of FIG. 1 but showing an alternate configuration where fibers of Kevlar™ and incorporated into an adhesive layer between the two film layers.

Many other variations are possible. In one alternative embodiment, for example, the net 121 is placed between two layers of film so that the outer surface of the composite airbag is smooth, i.e., since the film layer is generally smooth. In another embodiment shown in FIG. 1C, fibers 122 of Kevlar™ (crystalline polyamide) or other suitable material, are randomly placed and sealed between two film layers 110, 120. In the illustrated embodiment, the fibers 122 act to prevent the propagation of tears in much the same manner as a net. The net 121 may also be constructed from fibers.

Figure 1D:
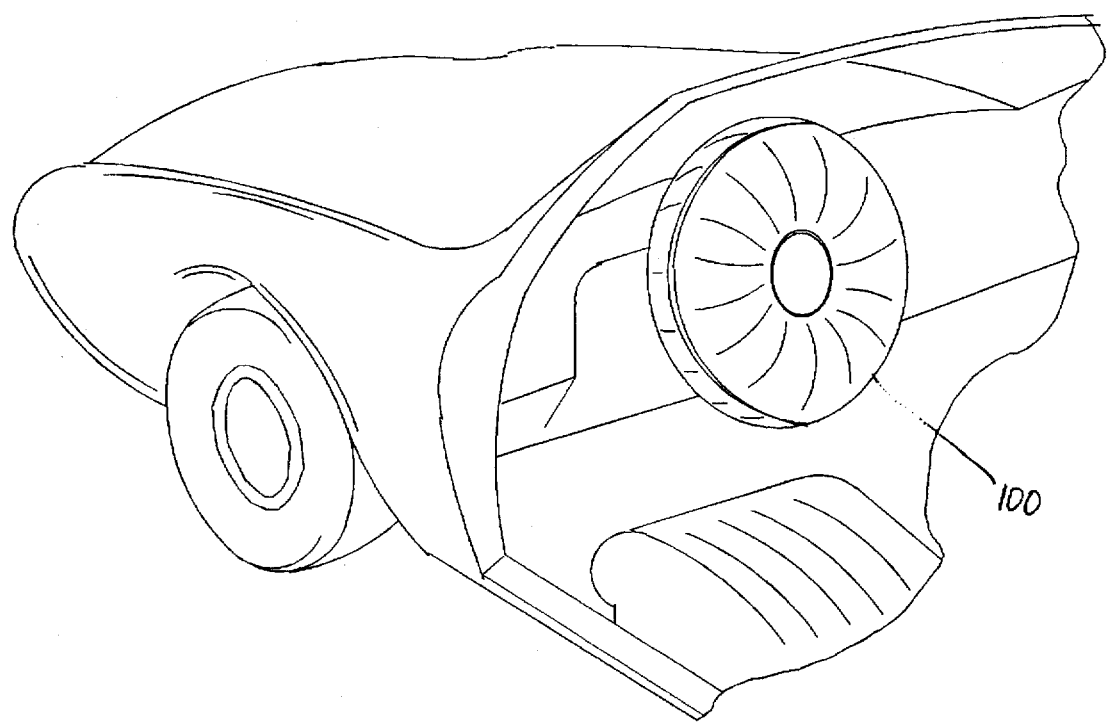
FIG. 1D is a perspective view with portions cut away of a vehicle showing the driver airbag of FIG. 1 mounted on the steering wheel and inflated.

The driver airbag 100 of FIG. 1 is shown mounted on a vehicle by conventional mounting means (not shown) in the driver side position and inflated in FIG. 1D.

It is understood that the airbag 100 is arranged prior to deployment in a module or more specifically in a housing of the module and further that the interior of the airbag is adapted to be in fluid communication with inflation means for inflating the airbag, e.g., gas generation means. Thus, the inflation means are coupled in some manner to the housing. Also, the module includes initiation means for initiating the gas generation means in response to a crash of the vehicle. This structure is for the most part not shown in the drawings but is included in connection with all of the airbag concepts disclosed herein.

Figure 2:
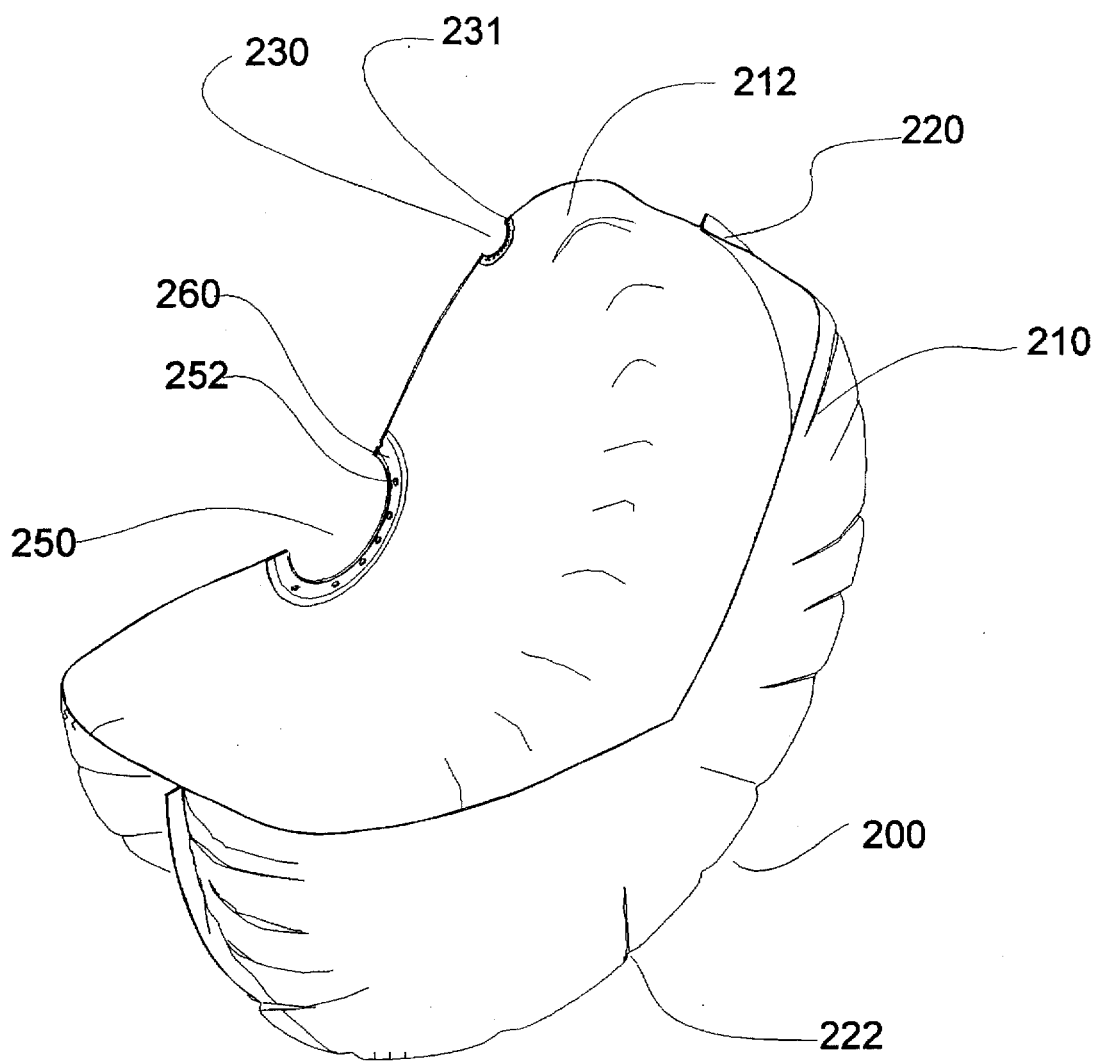
FIG. 2 is a partial cutaway perspective view of a driver side airbag made from plastic film.

An airbag made from plastic film is illustrated in FIG. 2 which is a partial cutaway perspective view of a driver side airbag 200 made from film. This airbag 200 is constructed from two flat disks or sheets of film material 210 and 212 which are sealed together by heat welding or adhesive to form seam 220. A hole 250 is provided in one of the disks 212 for attachment to an inflator (not shown). This hole 250 is reinforced with a ring of plastic material 260 and holes 252 are provided in this ring 260 for attachment to the inflator. A vent hole 230 is also provided in the disk 212 and it is surrounded by a reinforcing plastic disk 231. Since this airbag is formed from flat plastic sheets 210 and 212, an unequal stress distribution occurs causing the customary wrinkles and folds 222.

Several different plastic materials are used to make plastic films for balloons as discussed in U.S. Pat. Nos. 5,188,558, 5,248,275, 5,279,873, and 5,295,892, which are included herein by reference. These films are sufficiently inelastic that when two flat disks of film are joined together at their circumferences and then inflated, they automatically attain a flat ellipsoidal shape. This is the same principle used herein to make a film airbag, although the particular film materials chosen are different since the material for an airbag has the additional requirement that it cannot fail during deployment when punctured.

When the distinction is made herein between an "inelastic" film airbag and an elastic conventional airbag, this difference in properties is manifested in the ability of the untethered conventional fabric airbag to respond to the pressure forces by becoming approximately spherical with nearly equal thickness and diameter while the film airbag retains an approximate ellipsoidal shape with a significant difference between the thickness and diameter of the airbag.

An analysis of the film airbag shown in FIG. 2 shows that the ratio of the thickness to the diameter is approximately 0.6. This ratio can be increased by using films having greater elasticity. A completely elastic film, rubber for example, will also form a sphere when inflated. This ratio can also be either increased or decrease by a variety of geometric techniques some of which are discussed below. The surprising fact, however, is that without resorting to complicated tethering involving stitching, stress concentrations, added pieces of reinforcing material, and manufacturing complexity, the airbag made from film automatically provides nearly the desired shape for driver airbags upon deployment. Note that this airbag still has a less than optimum stress distribution which will be addressed below.

Figure 3A:
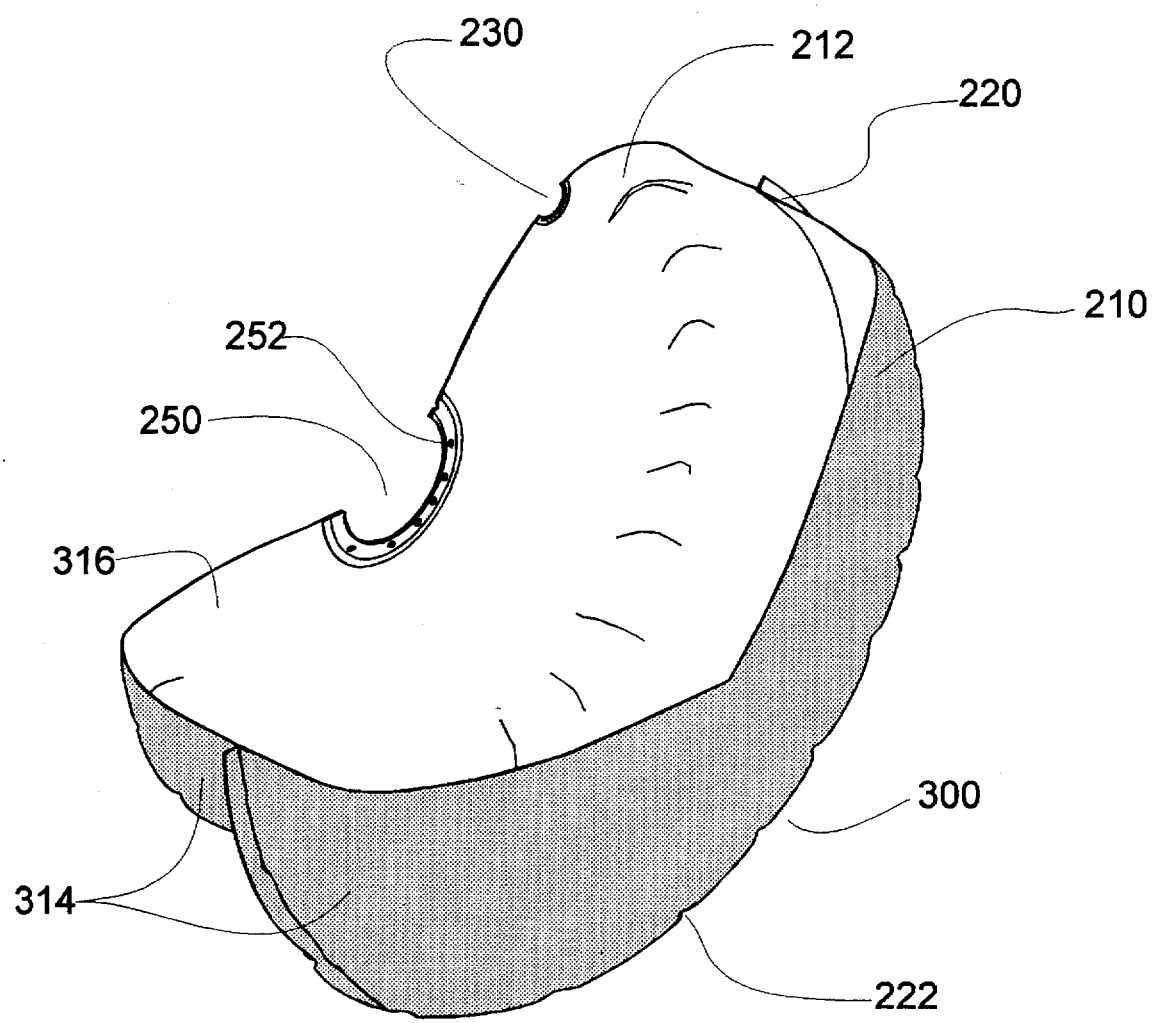
FIG. 3A is a partial cutaway perspective view of a driver side airbag made from plastic film and a fabric to produce a hybrid airbag.

Although there are many advantages in making the airbag entirely from film, there is reluctance on the part of the automobile manufacturers to make such a change in airbag design until the reliability of film airbags can be satisfactorily demonstrated. To bridge this gap, an interim design using a lamination of film and fabric is desirable. Such a design is illustrated in FIG. 3A which is a partial cutaway perspective view of a driver side airbag made from film 316 laminated with fabric 314 to produce a hybrid airbag 300. The remaining reference numbers represent similar parts as in FIG. 2. In all other aspects, the hybrid airbag acts as a film airbag. The inelastic nature of the film 316 causes this hybrid airbag 300 to form the proper shape for a driver airbag. The fabric 314, on the other hand, presents the appearance of a conventional airbag when viewed from the outside. Aside from the lamination process, the fabric 314 may be attached to the film 316 directly by suitable adhesives, such that there are only two material layers, or by heat sealing or any other convenient method.

Figure 3B:
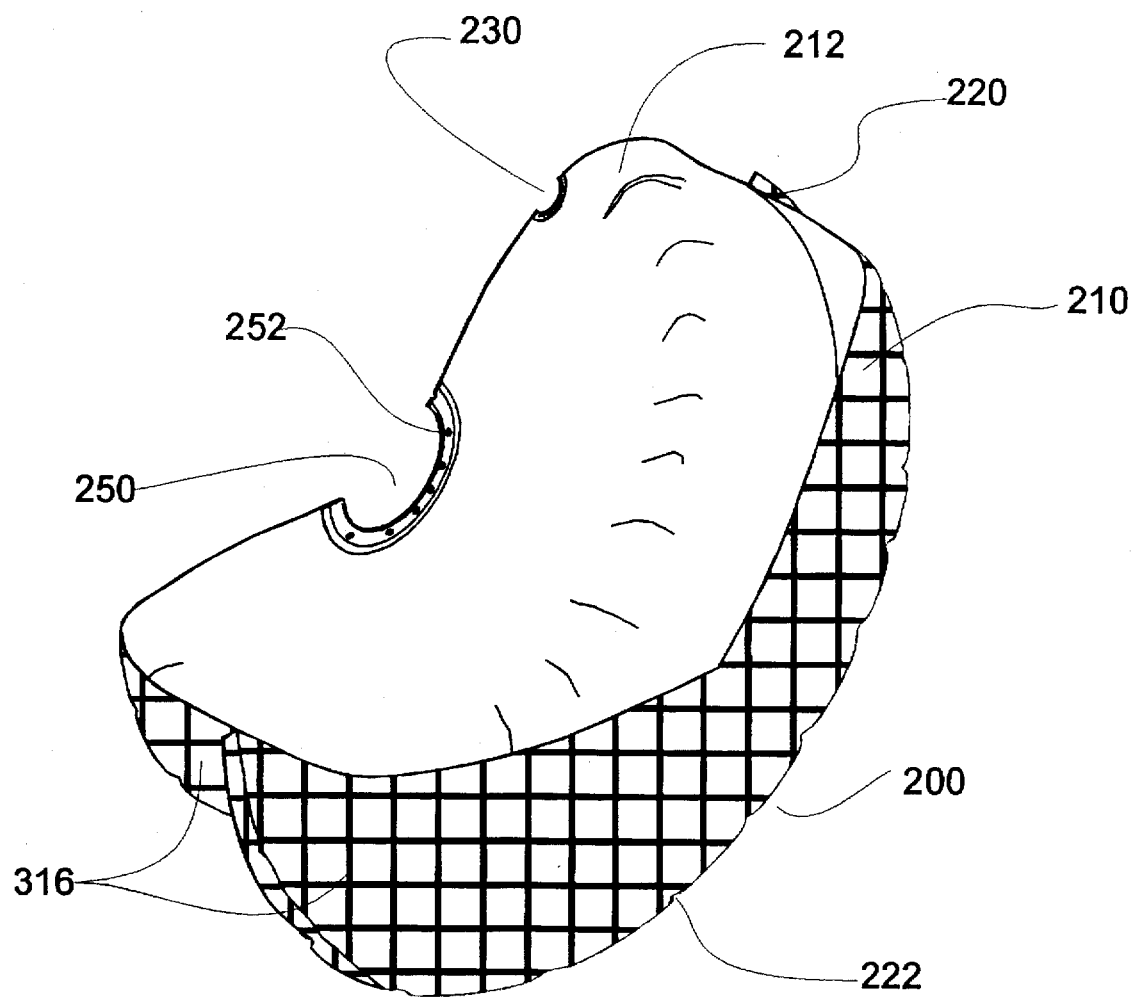
FIG. 3B is a partial cutaway perspective view of a driver side airbag made from plastic film and a net to produce a hybrid airbag.

Analysis, as disclosed in the above referenced patent application Ser. No. 08/247,763, has shown that a net is much stronger per unit weight than a fabric for resisting tears. This is illustrated in FIG. 3B which is a partial cutaway perspective view of a driver side airbag 200 made from film 212 and a net 316, which is preferably laminated to the film, to produce a hybrid airbag. The analysis of this system is presented in the above referenced patent application which is included herein by reference and therefore will not be reproduced here. The reference numerals designating the element in FIG. 3B correspond to the same elements as in FIG. 3A.

Figure 4A:
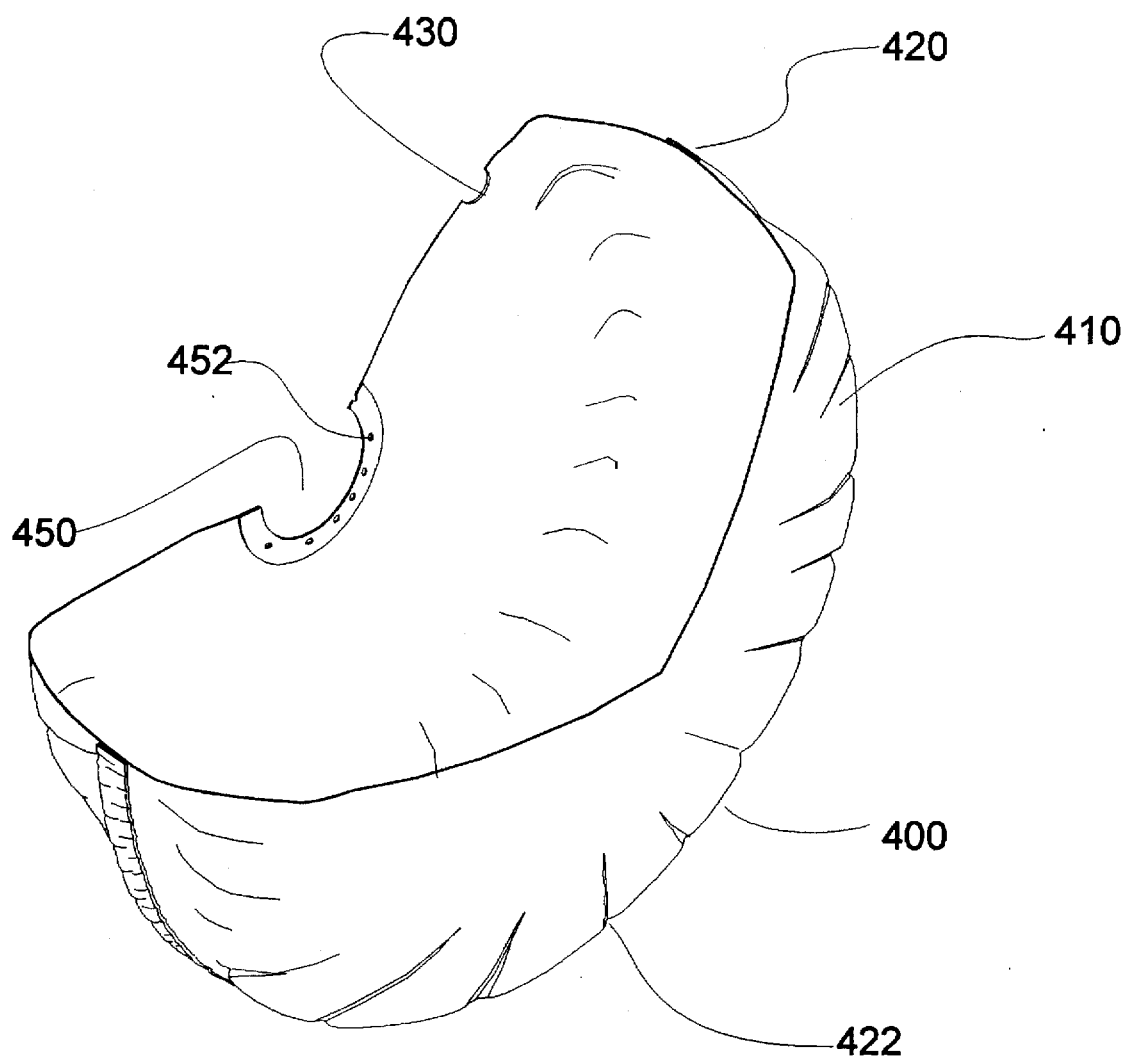
FIG. 4A is a partial cutaway perspective view of a driver side airbag made from plastic film using a blow molding process.

The film airbag designs illustrated thus far were constructed from flat plastic sheets which have been sealed by heat welding, adhesive, or otherwise. An alternate method to fabricate an airbag is to use a molding process to form an airbag 400 as illustrated in FIG. 4A which is a partial cutaway perspective view of a driver side airbag made from film using blow molding (a known manufacturing process). Blow molding permits some thickness variation to be designed into the product. In particular, a thicker annular zone 420 is provided on the circumference of the airbag 400 to give additional rigidity to the airbag in this area. Additionally, the material surrounding the inflator attachment hole 450 has been made thicker removing the necessity for a separate reinforcement ring of material. Holes 452 are again provided, usually through a secondary operation, for attachment of the airbag 400 to the inflator.

The vent hole 430 is formed by a secondary process and reinforced, or, alternately, provision is made in the inflator for the gases to exhaust therethrough, thereby removing the need for the hole 430 in the bag material itself since this design has not been stress optimized, the customary wrinkles and folds 422 also appear.

Figure 4B:
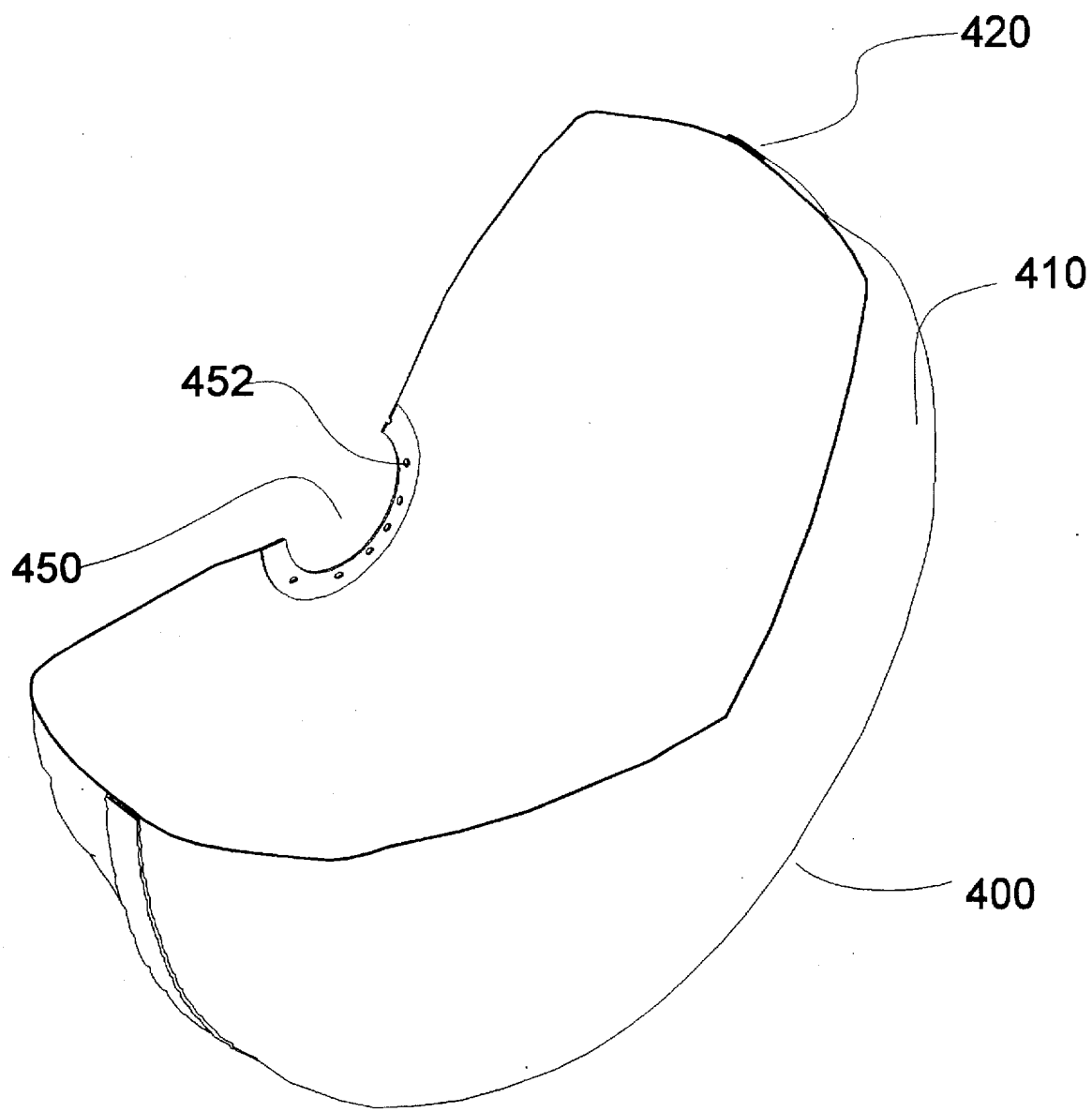
FIG. 4B is a partial cutaway perspective view of a driver side airbag made from plastic film using a blow molding process so that the airbag design has been partially optimized using finite element airbag model where the wrinkles have been eliminated and where the stresses within the film are more uniform.

One advantage of the use of the blow molding process to manufacture airbags is that the airbag need not be made from flat sheets. Through careful analysis using a finite element program for example, the airbag can be designed to substantially eliminate the wrinkles and folds seen in the earlier implementations. Such a design is illustrated in FIG. 4B which is a partial cutaway perspective view of a driver side airbag made from film using a blow molding process where the airbag design has been partially optimized using a finite element airbag model. This design has a further advantage in that the stresses in the material are now more uniform permitting the airbag to be manufactured from thinner material.

Figure 4C:
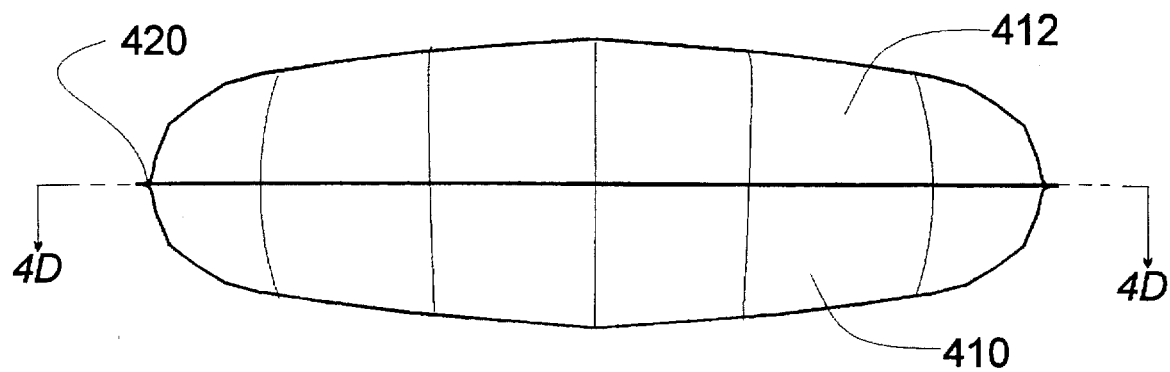
FIG. 4C is a cutaway view of a driver side airbag made from plastic film showing a method of decreasing the ratio of thickness to effective diameter.
Figure 4D:
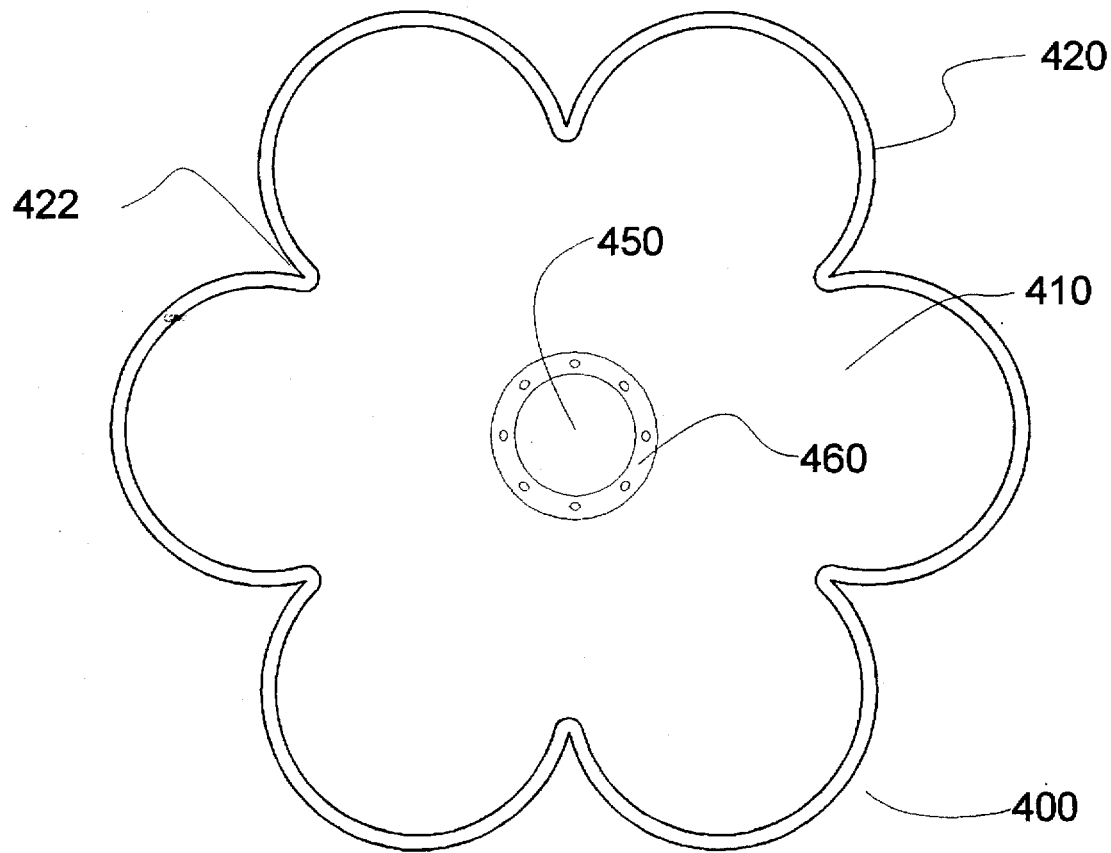
FIG. 4D is a view of a driver side airbag of FIG. 4C as viewed along line 4D—4D.

In some vehicles, and where the decision has been made not to impact the driver with the airbag (for example if a hybrid airbag is used), the inflated airbag comes too close to the driver if the ratio of thickness to diameter is 0.6. In these applications it is necessary to decrease this ratio to 0.5 or less. Thickness herein means the dimension of the inflated airbag measured coaxial with the steering column, assuming the airbag is mounted in connection with the steering column, and diameter, or average or effective diameter, is the average diameter measured in a plane perpendicular to the thickness. This ratio can be obtained without resorting to tethers in the design as illustrated in FIG. 4C which is a side view of a driver side airbag made from film where the ratio of thickness to effective diameter decreases. FIG. 4D is a view of the airbag of FIG. 4C taken along line 4D—4D. This airbag 400 is manufactured from two sheets of material 410 and 412 which are joined together by sealing means to form seal 420. Inflator attachment hole 450 is reinforced with a ring of plastic material 460 as described above. Many circumferential geometries can be used to accomplish this reduction in thickness to diameter ratio, or even to increase this ratio if desired. The case illustrated in FIG. 4C and FIG. 4D is one preferred example.

Figure 5:
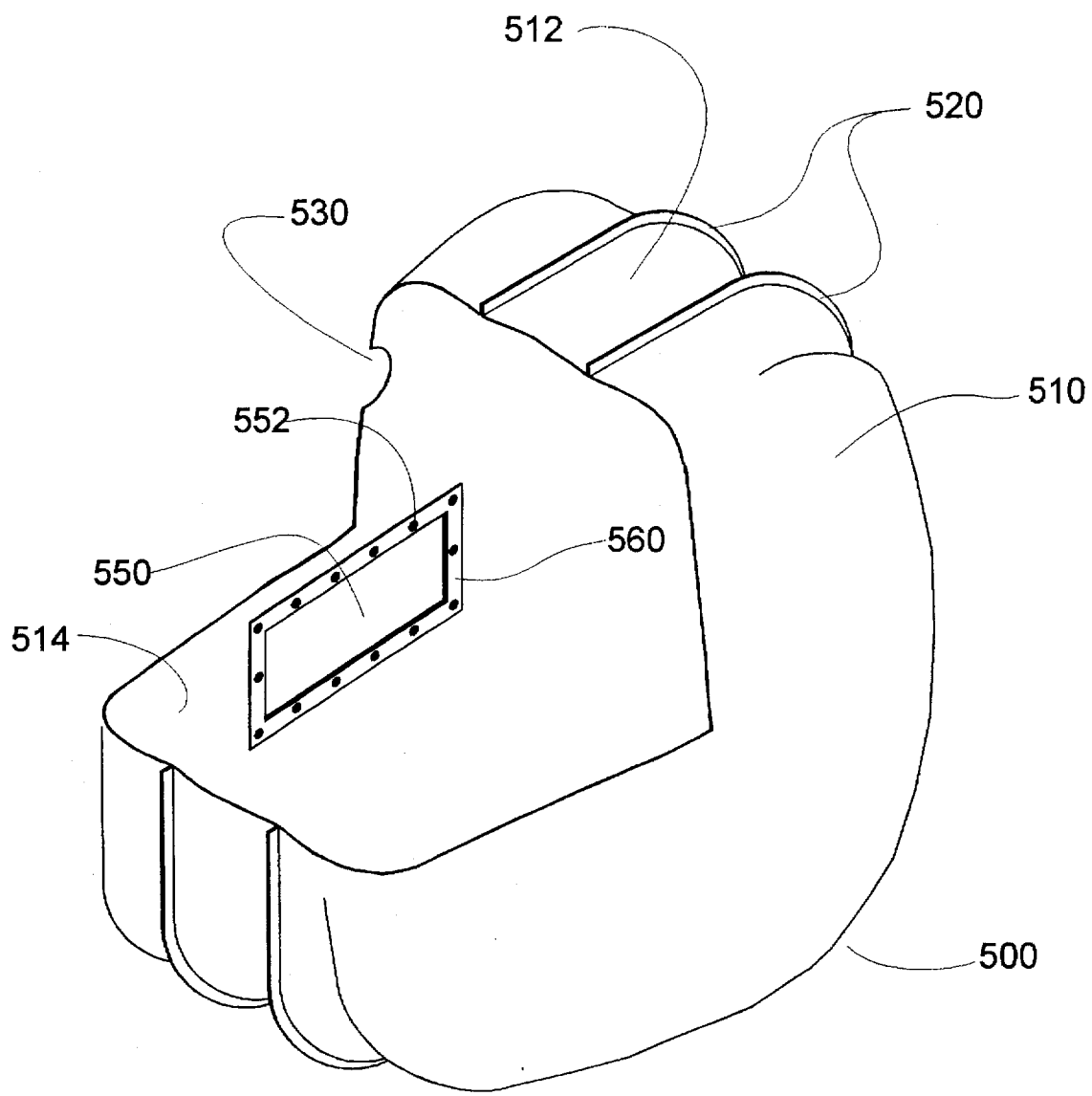
FIG. 5 is a partial cutaway perspective view of a passenger side airbag made from plastic film.

The discussion above has been limited to the driver side airbag which is attached to the vehicle steering wheel or otherwise arranged in connection therewith. This technology is also applicable to a passenger side airbag, which is generally attached to the instrument panel, as illustrated in FIG. 5 which is a partial cutaway perspective view of a passenger side airbag 500 made from three pieces of flat film 510, 512 and 514 which have joined seams 520 between adjacent pieces of film 510, 512, 514. Although illustrated as being constructed from a plurality of sheets of plastic film, this airbag can also be made by blow molding or other similar molding process, i.e., as one unitary sheet. Also, for many vehicles, the sheet 512 is unnecessary and will not be used permitting the airbag to once again be manufactured from only two flat sheets. The inflator attachment hole 550 is now typically rectangular in shape and is reinforced by a rectangular reinforcement plastic ring 560 having inflator mounting holes 552. A vent hole 530 is also provided to vent air and gases from the deploying airbag 500.

Figure 6:
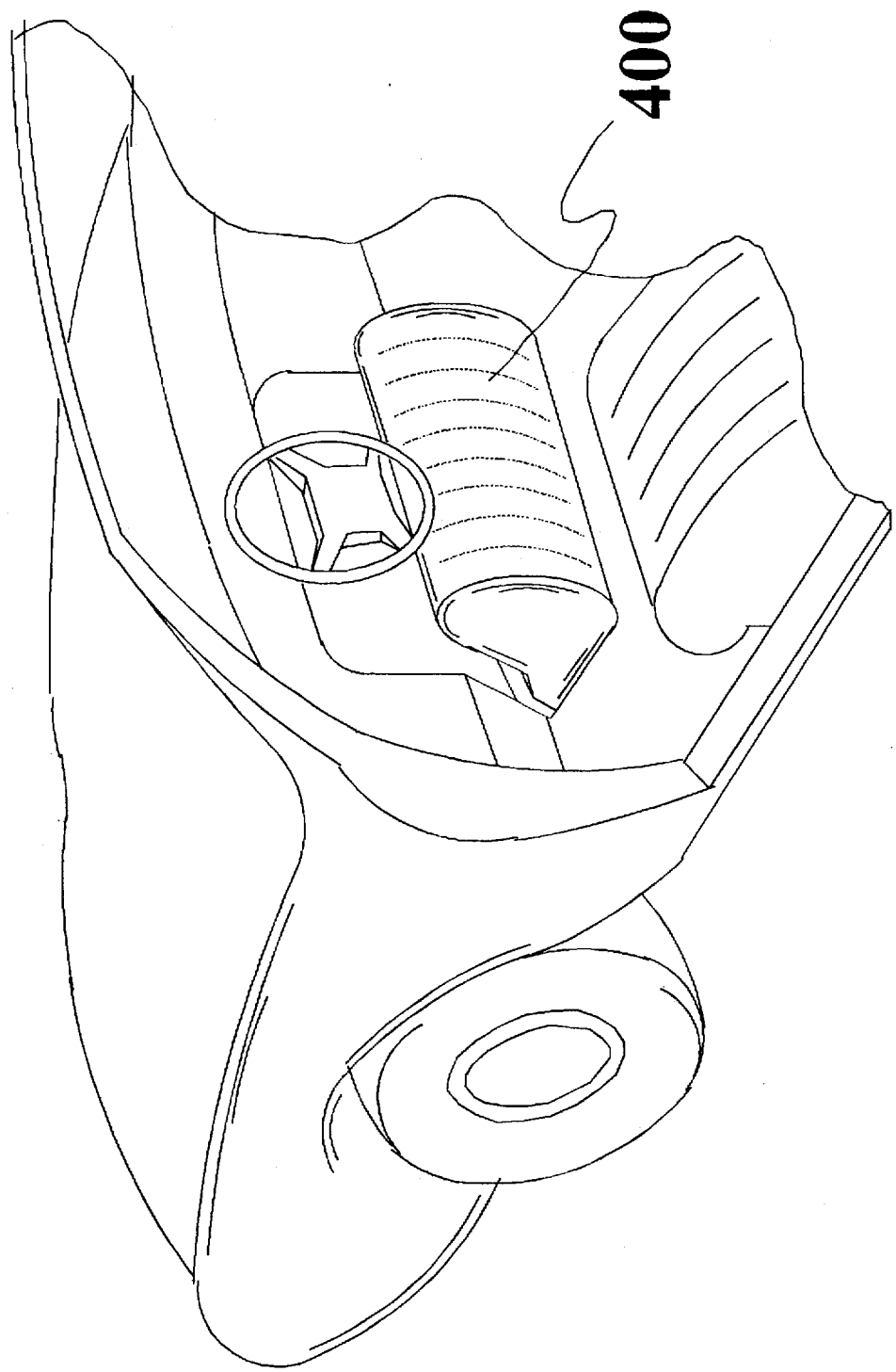
FIG. 6 is a perspective view with portions cut away of a vehicle showing the knee bolster airbag in an inflated condition mounted to provide protection for a driver.

In FIG. 6, a knee protection airbag for the front driver is shown generally at 400. Since the airbag fills the entire space between the knee and the instrument panel and since the instrument panel is now located at a substantial distance from the occupant's knees, there is substantially more deflection or stroke provided for absorbing the energy of the occupant. Since the distance of deployment of the knee airbag is limited only by the interaction with an occupant or some other object, the knee airbag will inflate until it fills the void below the upper airbag, not illustrated in this figure.

Figure 7:
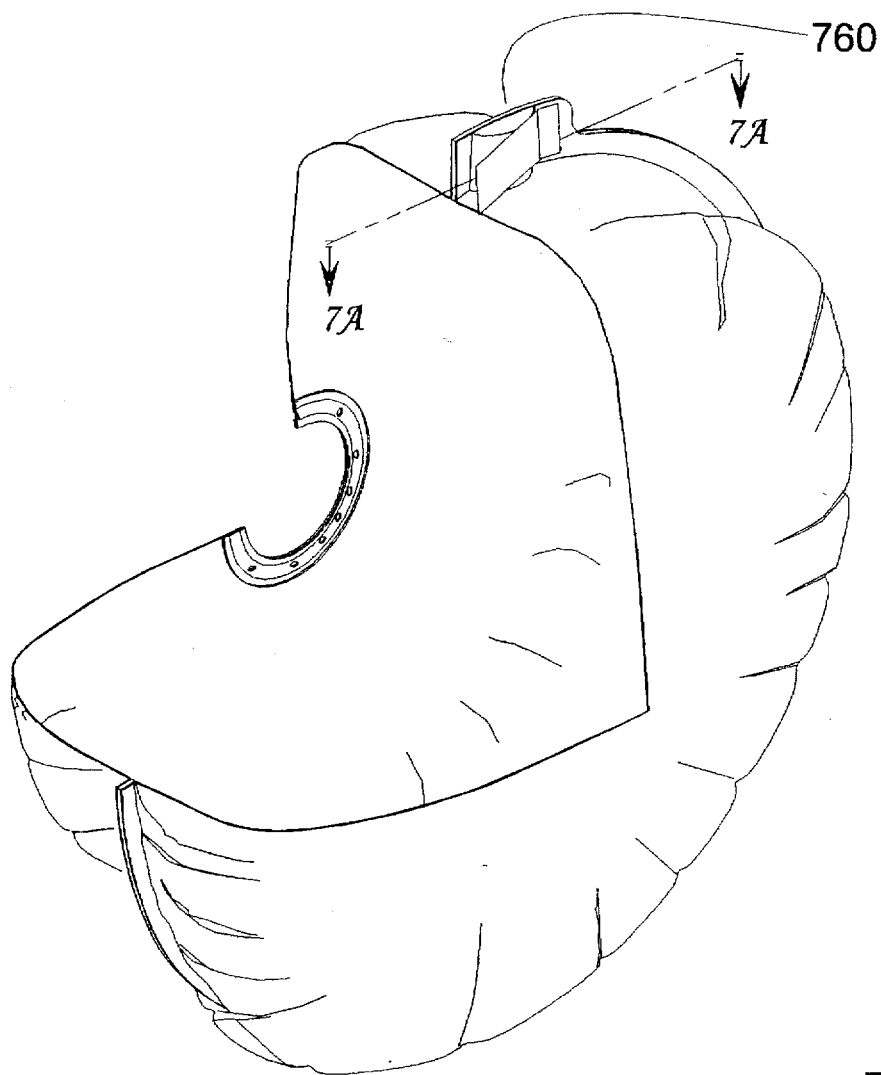
FIG. 7 is a partial cutaway perspective view of a driver side airbag made from plastic film having a variable vent in the seam of the airbag.
Figure 7A:
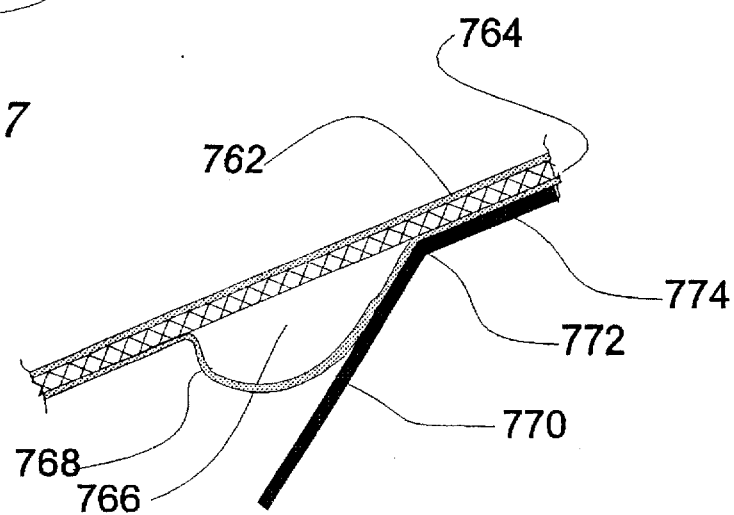
FIG. 7A is an enlargement of the variable vent of FIG. 7 taken along lines 7A—7A of FIG. 7.

As an alternate to providing a fixed vent hole as illustrated in the previous examples, a variable vent hole can be provided as shown in FIGS. 7 and 7A, FIG. 7 being a partial cutaway perspective view of a driver side airbag made from film having a variable vent in the seam of the airbag. In this embodiment of an airbag, a hinged elastic member 770 is biased so that it tends to maintain vent 760 in a closed position. As pressure rises within the airbag, the vent 760 is forced open as shown in FIG. 7 and FIG. 7A, which is a detail of the vent 760 shown in FIG. 7 taken along line 7A—7A. This construction enables the use of a smaller inflator and also reduces the maximum chest acceleration of the occupant in a crash and more accurately controls the deceleration of the occupant. In FIGS. 7 and 7A, vent 760 contains a opening 766 formed between film layer 768 and reinforcement member 764. Film layer 762 is also sealed to reinforcing member 764. Member 770 is attached to reinforcing member 764 through film 768. A weakened section 772 is formed in member 770 to act as a hinge. The elasticity of the material, which may be either metal or fiber reinforced plastic or other suitable material, is used to provide the biasing force tending to hold the variable opening closed.

In a conventional airbag module, when the inflator is initiated, gas pressure begins to rise in the airbag which begins to press on the deployment door. When sufficient force is present, the door breaks open along certain well-defined weakened seams permitting the airbag to emerge from its compartment. The pressure in the airbag when the door opens, about 10 to 20 psi, is appropriate for propelling the airbag outward toward the occupant, the velocity of which is limited by the mass of the airbag. In the case of a film airbag, this mass is substantially less, perhaps by as much as a factor of ten, causing it to deploy at a much higher velocity if subjected to these high pressures. This will place unnecessary stresses in the material and the rapid movement of the airbag past the deployment door could induce abrasion and tearing of the film by the deployment door. A film airbag, therefore, must be deployed at a substantially lower pressure. However, conventional deployment doors require this higher pressure to open. This problem is discussed in detail in the above referenced co-pending patent applications where, in one implementation, a pyrotechnic system is used to cut open the door according to the teachings of the Barnes patent (U.S. Pat. No. 5,390,950).

Figure 8:
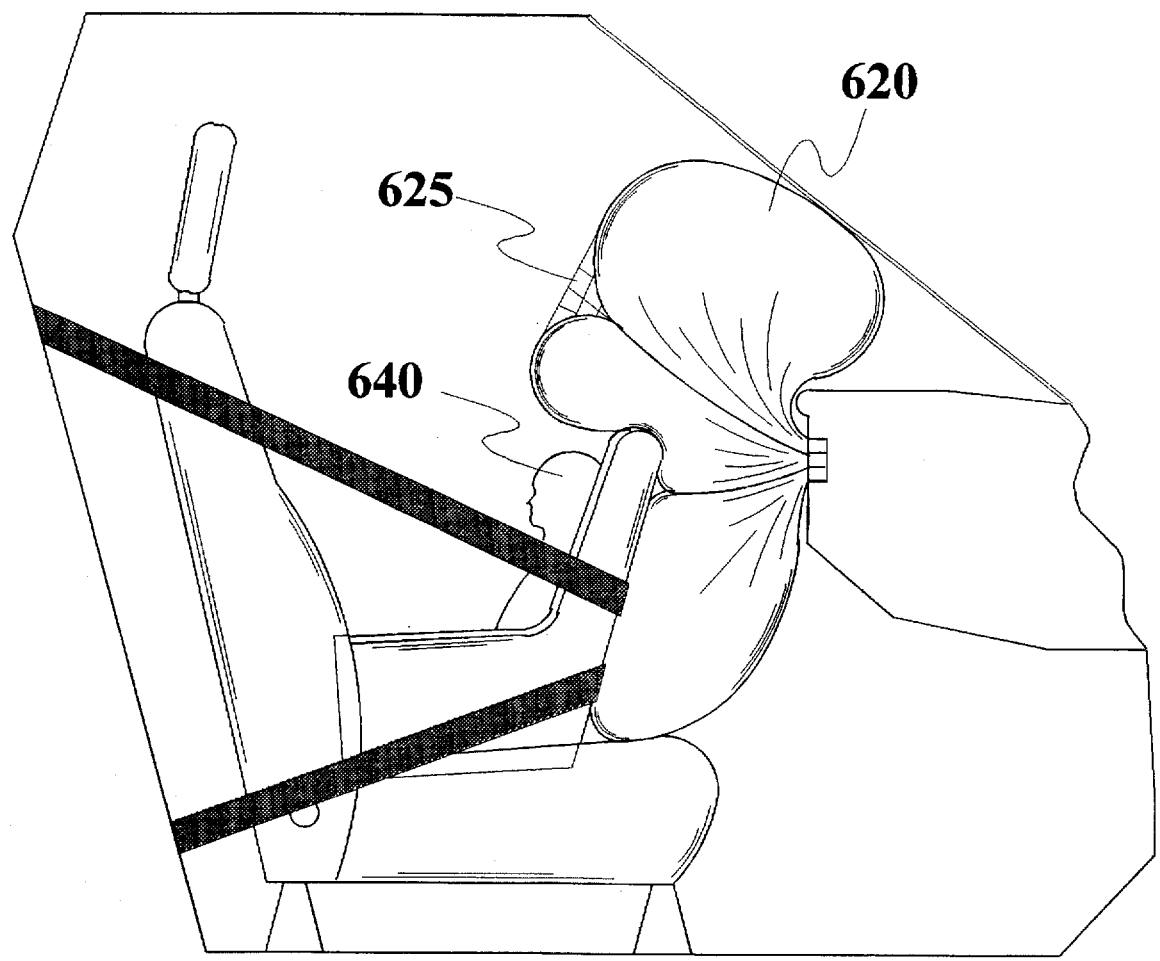
FIG. 8 is a perspective view of a self limiting airbag system composed of a multiplicity of airbags surrounded by a net, most of which has been cutaway and removed, designed to not cause injury to a child in a rear facing child seat.

In FIG. 8, the advantages of the self limiting airbag system disclosed herein and in more detail in copending patent application Ser. No. 08/571,247, when used with a rear facing child seat, are illustrated. In this case, where multiple film airbags are illustrated, the airbags deploy but the deployment process stops when each of the film airbags interacts with the child seat and the pressure within each bag rises to where the flow is stopped. In this case, the child 640 is surrounded by airbags 620 and further protected from the accident rather than being injured as is the case with current design airbags. The airbags 620 are additionally surrounded by a net 625 most of which has been cutaway and removed in the figure. Naturally, in other implementations a single airbag will be used in place of the multiple airbags illustrated here.

The self-limiting feature is illustrated here by either a variable orifice exhaust port in the airbag or, preferably, provision is made in the airbag inflator itself as illustrated in the referenced patent application where a close-down of the aspiration system is used during the deployment portion of the process and a smaller variable orifice is used during the deflation portion. The aspiration cutoff can be designed so that the airbag deploys until the pressure begins to rise within the bag which then stops the inflation process, closes the aspiration ports and the airbag then becomes stiffer to absorb the kinetic energy of the impacting occupant. Thus, during the deployment phase, very little force is placed in the occupant, or the child seat, but as the occupant begins to move into and load the airbag, substantial force is provided to limit his or her motion.

Figure 9:
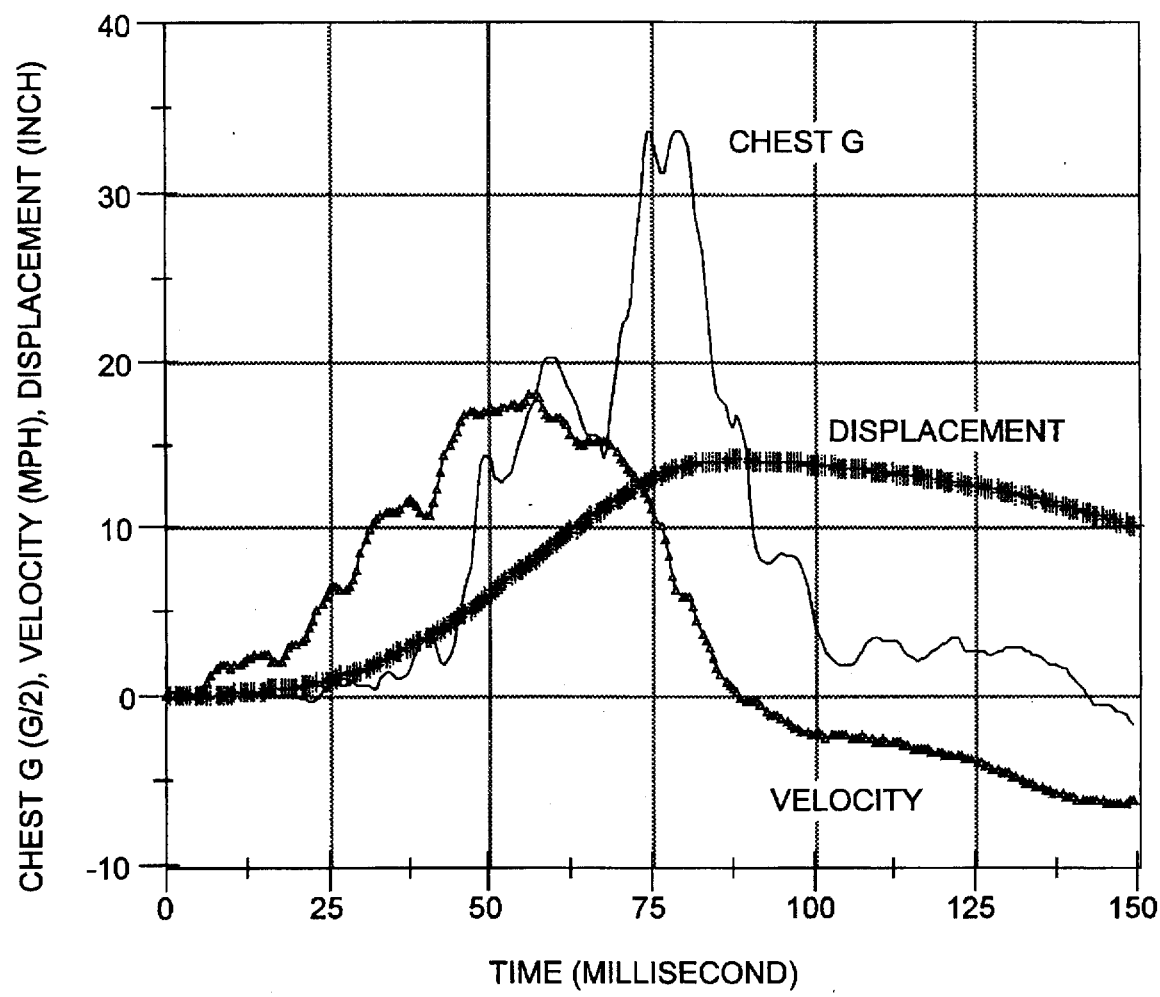
FIG. 9 shows a plot of the chest acceleration of an occupant and the occupant motion using a conventional airbag.
Figure 10:
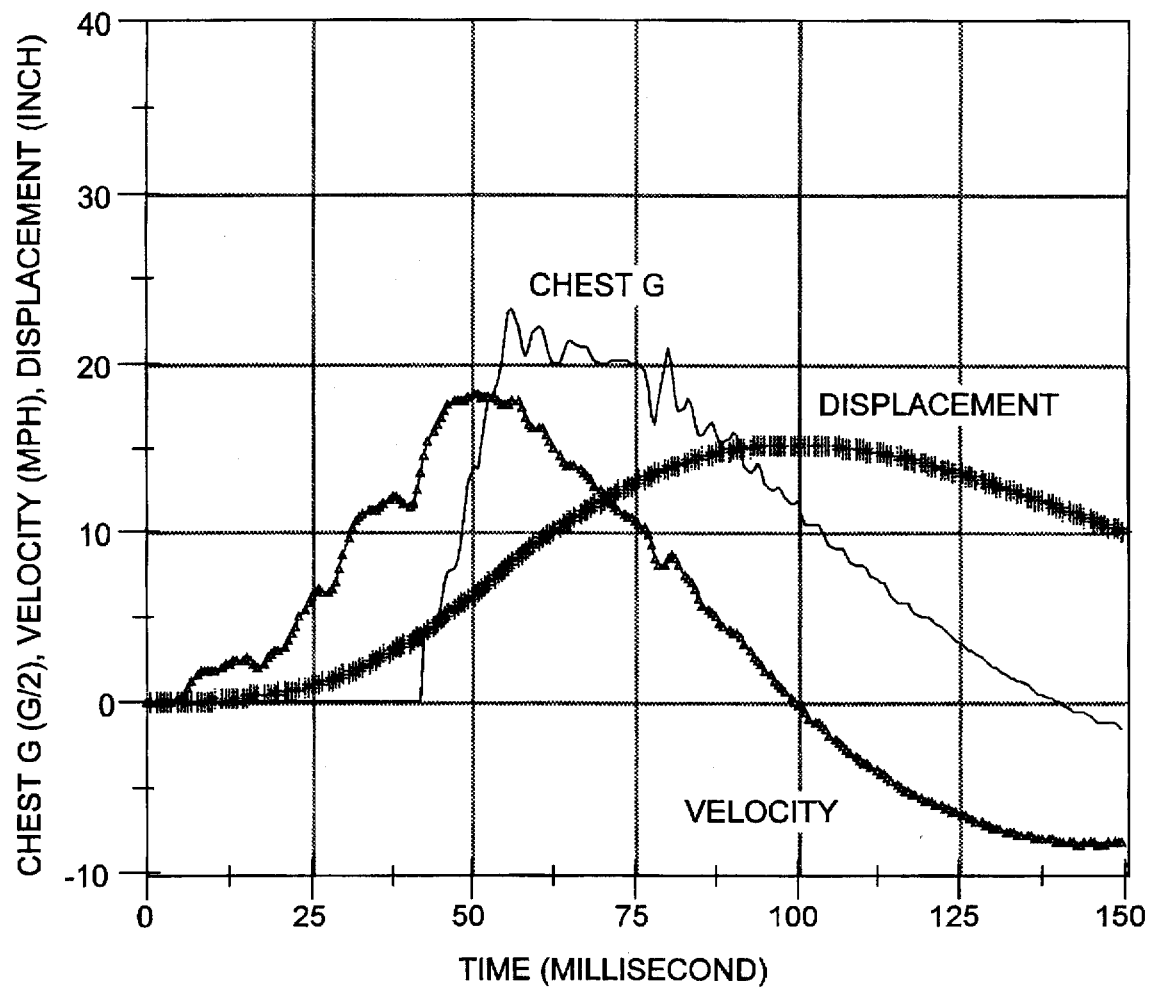
FIG. 10 shows the chest acceleration of an occupant and the resulting occupant motion when the variable orifice of this invention is utilized.

FIG. 9 shows a typical chest G pulse experienced by an occupant and the resulting occupant motion when impacting an airbag during a 35 MPH frontal impact in a small vehicle. When the variable orifice airbag is used in place of the conventional airbag, the chest acceleration curve is limited and takes the shape similar to a simulation result shown in FIG. 10. Since it is the magnitude of the chest acceleration that injures the occupant, the injury potential of the airbag in FIG. 10 is substantially less than that of FIG. 9.

Since the variable exhaust orifice remains closed as long as the pressure in the airbag remains below the set value, the inflator need only produce sufficient gas to fill the airbag once. This is approximately half of a gas which is currently produced by standard inflators. Thus, the use of a variable orifice significantly reduces the total gas requirement and therefore the size, cost and weight of the inflator. Similarly, since the total amount of gas produced by all inflators in the vehicle is cut approximately in half, the total amount of contaminants and irritants is similarly reduced or alternately each inflator used with the variable orifice airbag is now permitted to be somewhat dirtier than current inflators without exceeding the total quantity of contaminants in the environment. This in turn, permits the inflator to be operated with less filtering, thus reducing the size and cost of the inflator.

The characteristics of inflators vary significantly with temperature. Thus, the mass flow rate of gas into the airbag similarly is a significant function of the temperature of the inflator. In conventional fixed orifice airbags, the gas begins flowing out of the airbag as soon as positive pressure is achieved. Thus, the average pressure in the airbag similarly varies significantly with temperature. The use of a variable orifice system as taught by this invention however, permits the bags to be inflated to the same pressure regardless of the temperature of the inflator. Thus, the airbag system will perform essentially the same whether operated at cold or hot temperature, removing one of the most significant variables in airbag performance. The airbag of this invention provides a system which will function essentially the same at both cold and hot temperatures.

The variable orifice airbag similarly solves the dual impact problem where the first impact is sufficient to trigger the crash sensors in a marginal crash where the occupant is wearing a seatbelt and does not interact with the airbag. A short time later in a subsequent more serious accident, the airbag will still be available to protect the occupant. In conventional airbags using a fixed orifice the gas generator may have stopped producing gas and the airbag may have become deflated.

Since the total area available for exhausting gas from the airbag can be substantially larger in the variable orifice airbag, a certain amount of protection for the out-of-position occupant is achieved even when the aspiration system of the referenced copending application is not used. If the occupant is close to the airbag when it deploys, the pressure will begin to build rapidly in the airbag. Since there is insufficient time for the gas to be exhausted through the fixed orifices, this high pressure results in high accelerations on the occupant's chest and can cause injury. In the variable orifice embodiment, however, the pressure will reach a certain maximum in the airbag and then the valve would open to exhaust the gas as fast as the gas generator is pumping gas into the airbag thus maintaining a constant and lower pressure than in the former case. Naturally, the bag must be sufficiently deployed for the valve to be uncovered so that it can operate. Alternately, the valving system can be placed in the inflator and caused to open even before the cover opens thereby handling the case where the occupant is already against the deployment door when the airbag deployment is initiated.

Many geometries can be used to achieve a variable orifice in an airbag. These include very crude systems such as slits placed in the bag in place of round exhaust vents, rubber patches containing one or more holes which are sewn into the bag such that the hole diameter gets larger as the rubber stretches in response to pressure in the bag, plus a whole variety of flapper valves similar to that disclosed in this invention. Slit systems, however, have not worked well in experiments and rubber patches are effected by temperature and thus are suitable only for very crude systems. Similarly, the bag itself could be made from a knitted material, which has the property that its porosity is a function of the pressure in the bag. Thus, once again, the total amount of gas flowing through the bag becomes a function of the pressure in the bag.

Although the case where the pressure is essentially maintained constant in the bag through the opening of a valve has been illustrated, it is possible that for some applications a different function of the pressure in the bag may be desirable. Thus, a combination of a fixed orifice and variable valve might be desirable. The purpose of adjusting the opening area of an airbag vent hole is to control the gas flow rate out of the vent hole according to the pressure inside the airbag. If the pressure is higher, then the area of the vent hole becomes larger and allows more gas to flow out. By regulating the pressure inside an airbag, the force applied on an occupant is minimized.

One method of forming a film airbag is illustrated generally at 700 in FIG. 11. In this implementation, the airbag is formed from two flat sheets of film material which have been heat or adhesive sealed at joints 721 to form long tubular shaped mini-airbags in much the same way that an air mattress is formed. In FIG. 11, a single layer of mini-airbags 720 is shown. In other implementations, two or more layers would be used. Also, although a tubular pattern has been illustrated, other patterns are also possible such as concentric circles, waffle-shaped or one made from rectangles.

There has thus been shown and described an airbag system with a self-limiting and self-shaping airbag which fulfills all the objects and advantages sought after. Many changes, modifications, variations and other uses and applications of the subject invention will, however, become apparent to those skilled in the art after considering this specification and the accompanying drawings which disclose the preferred embodiments thereof all such changes, modifications, variations and other uses and applications which do not depart from the spirit and scope of the invention are deemed to be covered by the invention which is limited only by the following claims. For example, the present invention describes numerous different airbag constructions as well as different methods for fabricating airbags. It is within the scope of the invention that all of the disclosed airbags can, for the most part, be made by any of the methods disclosed herein. Thus, in one typical process for constructing a film airbag having at least two compartments, either isolated from one another, within one another or in flow communication with each other, at least one flat panel of film airbag material is provided and then manipulated, processed or worked to form the different compartments. More particularly, the flat panel is joined at appropriate locations to form the different compartments, e.g., by heat sealing or an adhesive. The compartments may be any shape disclosed herein, e.g., tubular-shaped.

We claim:

1. In a vehicle having an inflatable occupant protection system, an inflatable occupant restraint module comprising:

a housing mounted in the vehicle and having an interior;

at least one deployable airbag contained within said housing interior prior to deployment, said at least one airbag comprising a respective first non-perforated sheet of film and a member arranged in connection with said first sheet of film for arresting the propagation of a tear in said first sheet of film, said member being selected from the group consisting of (i) a network of multi-directional material strips and (ii) a second non-perforated sheet of film having substantially anisotropic tear properties whereby the direction of least tear resistance of said second sheet of film is different than a direction of least tear resistance of said first sheet of film, inflation means coupled to said housing for inflating said at least one airbag, said inflation means comprising gas supply means for supplying a gas into an interior of said at least one airbag;

attachment means for attaching said at least one airbag to and in fluid communication with said inflation means; and initiation means for initiating said gas supply means to supply the gas into the interior of said at least one airbag in response to a crash of the vehicle.

2. The module in accordance with claim 1, wherein said first sheet of film has substantially anisotropic tear properties and said member is a second smooth, non-perforated sheet of film attached to said first sheet of film and having substantially anisotropic tear properties whereby a direction of least tear resistance of said second sheet of film is different than a direction of least tear resistance of said first sheet of film.

3. The module in accordance with claim 2, further comprising adhesive means for adhering said first sheet of film directly to said second sheet of film, said adhesive means being applied in a pattern to at least one of said first sheet of film and said second sheet of film.

4. The module in accordance with claim 2, wherein said first and second sheets of film are comprised of materials having different properties.

5. The module in accordance with claim 1, wherein said first sheet of film and said member of each of said at least one airbag are structured and arranged to provide said at least one airbag with a mass to enable said at least one airbag to be deployed to a sufficient size upon complete inflation by said inflation means into direct engagement with a specific occupant sitting in the mid seating position of the vehicle such that there is no substantial displacement between the specific occupant and said fully inflated at least one airbag prior to impact of the specific occupant with said at least one airbag caused by the movement of the specific occupant.

6. In a vehicle having an inflatable occupant protection system, an inflatable occupant restraint module comprising:

a housing mounted in the vehicle and having an interior;

at least one deployable airbag contained within said housing interior prior to deployment;

a net for surrounding said at least one airbag during and after deployment thereof and attached to said housing, said net contained within said housing interior prior to deployment and comprising a network of multi-directional material strips;

inflation means coupled to said housing for inflating said at least one airbag, said inflation means comprising gas supply means for supplying gas into an interior of said at least one airbag;

attachment means for attaching said at least one airbag to and in fluid communication with said inflation means, and initiation means for initiating said gas supply means to supply the gas into the interior of said at least one airbag in response to a crash of the vehicle.

7. The module in accordance with claim 6, wherein said material strips are interlaced to define a plurality of openings having an opening dimension of at least 0.25 inches.

8. The module in accordance with claim 6, wherein a first side of said net is positioned adjacent said at least one airbag prior to deployment of said at least one airbag, and further comprising a film layer arranged on a second side of said net whereby said at least one airbag is the innermost member in a direction of deployment.

9. The module in accordance with claim 8, wherein said network of material strips comprises a mesh of densely packed crystalline polyamide fibers arranged in a multitude of directions.

10. The module in accordance with claim 6, further comprising a variably opening ventilation port such that when outward deployment of said at least one airbag is impeded, pressure in said at least one airbag is relieved by means of said ventilation port.

11. The module in accordance with claim 6, wherein said at least one airbag comprises a sheet of plastic film, further comprising adhesive means for attaching said film sheet to said net.

12. The module in accordance with claim 6, wherein said material strips are woven together to form said interlaced network.

13. The module in accordance with claim 6, wherein said material strips are integrated with one another during a molding process and said net is directly attached to said at least one airbag.

14. The module in accordance with claim 6, wherein said net defines an interior and said at least one airbag defines an interior fillable with the gas from said gas generation means during deployment, said interior of said net being smaller than said interior of said at least one airbag.

15. The module in accordance with claim 6, wherein said at least one airbag comprises a plurality of airbags situated inside of said net in fluid communication with said inflation means but mutually exclusive of each other.

16. The module in accordance with claim 1, wherein said first sheet of film is formed from at least two pieces of flat inelastic film having peripheral edges, a first one of said at least two pieces of inelastic plastic film having at least one port, said at least two pieces of inelastic plastic film being connected together only at said peripheral edges.

17. The module in accordance with claim 1, wherein said material strips are interlaced.

18. The module in accordance with claim 6, wherein said at least one airbag comprises at least two pieces of flat inelastic film having peripheral edges, a first one of said at least two pieces of inelastic plastic film having at least one port, said at least two pieces of inelastic plastic film being connected together only at said peripheral edges.

19. The module in accordance with claim 6, wherein said material strips are arranged in two directions perpendicular to one another.

20. The module in accordance with claim 6, wherein said material strips are interlaced.

* * * * *